United States Patent [19]

Budde et al.

[11] 4,367,524

[45] Jan. 4, 1983

[54] MICROINSTRUCTION EXECUTION UNIT FOR USE IN A MICROPROCESSOR

[75] Inventors: David L. Budde, Portland; Stephen R. Colley, Aloha; Stephen L. Domenik, Portland; Allan L. Goodman, Hillsboro; James D. Howard, Beaverton, all of Oreg.

[73] Assignee: Intel Corporation, Santa Clara, Calif.

[21] Appl. No.: 119,432

[22] Filed: Feb. 7, 1980

[51] Int. Cl.³ .......................... G06F 9/00; G06F 9/22; G06F 7/00
[52] U.S. Cl. ..................................... 364/200
[58] Field of Search ... 364/200 MS File, 900 MS File

[56] References Cited

U.S. PATENT DOCUMENTS

| | | | |
|---|---|---|---|
| 3,302,183 | 1/1967 | Bennett et al. | 364/200 |
| 3,878,514 | 4/1975 | Faber | 364/200 |
| 4,008,642 | 2/1977 | Kanda | 364/200 |
| 4,079,455 | 3/1978 | Ozga | 364/200 |

Primary Examiner—Gareth D. Shaw
Assistant Examiner—John G. Mills, III

Attorney, Agent, or Firm—Owen L. Lamb

[57] ABSTRACT

An execution unit which is part of a general-purpose microprocessor, partitioned between two integrated circuit chips, with the execution unit on one chip and an instruction unit on another chip. The execution unit provides the interface for accessing a main memory to thereby fetch data and macroinstructions for transfer to the instruction unit when requested to do so by the instruction unit. The execution unit receives arithmetic microinstructions in order to perform various arithmetic operations, and receives access-memory microinstructions in order to develop memory references from logical addresses received from the instruction unit. Arithmetic operations are performed by a data manipulation unit which contains registers and arithmetic capability, controlled by a math sequencer. Memory references are performed by a reference-generation unit which contains base-and-length registers and an arithmetic capability to generate and check addresses for referencing an off-chip main memory, and is controlled by an access sequencer.

10 Claims, 3 Drawing Figures

FIG.2 - EXECUTION UNIT

MICROINSTRUCTION EXECUTION UNIT FOR USE IN A MICROPROCESSOR

BACKGROUND OF THE INVENTION

1. Field of the Invention

The present invention relates to data processing systems, and more particularly to an improved execution unit for emulating a function encoded in a stream of microinstructions generated by an instruction unit which decodes macroinstructions and generates said microinstruction stream.

2. Description of the Prior Art

In copending patent application Ser. No. 971,661 of Stephen R. Colley et al, entitled "Data Processing System," filed Dec. 21, 1978, there is disclosed an object-oriented data processor architecture which takes full advantage of recent advances in the stage-of-the-art of very large-scale, integrated-circuit technology. The patent describes a general-purpose processor, which is able to perform generalized computation over a wide spectrum of data types supported by the architecture. Such a complex microprocessor requires a number of complex logical circuits. With present-day integrated-circuit technology, this complex microprocessor is too large to be fabricated on a single chip and therefore, it must be partitioned and fabricated on a number of chips.

In copending patent application of William Richardson, et al entitled "Macroinstruction Unit for Use in a Microprocessor," Ser. No. 119,433 filed on Feb. 7, 1980, several factors are discussed which must be considered in determining where to partition this logic. As described therein, and in the above-identified Colley, et al patent, the microprocessor is partitioned between two chips with an instruction unit on one chip and an execution unit on the other chip. Communication between chips is performed over an interchip bus. Off-chip communication with external devices, such as main memory and input/output devices, is accomplished over an interface more fully described in U.S. Pat. No. 4,315,308 entitled "Microprocessor Interface Control Apparatus" by Daniel K. Jackson, filed on Dec. 21, 1978 which issued on Feb. 9, 1982 and is assigned to Intel Corporation.

The following is a summary of some of the prior approaches to implementing logic for executing microinstructions on an integrated circuit chip.

The Henle, et al U.S. Pat. No. 3,798,606 partitions a computer by splitting up the CPU and memory functions into M modules for processing M bits of data. This patent is representative of bit/slice partitioning techniques which are not utilized in the present invention, which uses a pipeline technique.

The Holmes, Jr., et al U.S. Pat. No. 3,943,494 discloses a microprocessor which is partitioned into a number of synchronized subprocessors each implemented on a separate chip. Each subprocessor has an instruction register and instruction-executing circuits for independently executing a portion of an instruction. Execution is initiated and synchronized by simultaneously loading the same instruction into each subprocessor. This patent does not disclose the concept of partitioning a microprocessor at the instruction unit/execution unit boundary as is done in the present invention. On the contrary, the patent utilizes an instruction register on each subprocessor chip.

In the Watanabe, et al U.S. Pat. No. 3,947,822, a microprocessor is divided into a number of control units such that respective instructions of the control units are executed in a manner to overlap in time. While it discloses a control unit on one chip and a register unit on another chip, it utilizes a time-division control mechanism whereas applicant's invention utilizes a pipelined technique.

The O'Leary U.S. Pat. No. 4,075,704 discloses a pipelined microprocessor. An adder and a multiplier are intercoupled by a number of simultaneously operable parallel buses so that they operate in parallel. The adder and multiplier each include a number of stages separated by intermediate temporary storage registers which receive the partial results of a computation for use by the next stage during the next clock cycle. While this patent discloses a pipelined microprocessor, it does not disclose the partitioning of the microprocessor at the instruction unit/execution unit interface, such as disclosed by the present invention.

It is a primary object of the present invention to provide an execution unit for receiving microinstructions directing said execution unit to perform arithmetic operations and to develop memory addresses from logical addresses contained in said microinstructions.

It is a further object of the present invention to provide an execution unit which is capable of processing variable-length microinstructions received from an instruction unit, and to signal said insturction unit prior to completion of said microinstruction, so that the instruction unit can have a new microinstruction available for execution.

It is also an object of the present invention to provide an execution unit which is so structured that it is able to stop executing an arithmetic operation in order to fetch a macroinstruction from main memory as requested by an instruction unit so that the instruction unit may begin decoding a next macroinstruction while said execution unit is executing the microinstructions comprising a previous macroinstruction.

BRIEF SUMMARY OF THE INVENTION

Briefly, the above objects are accomplished in accordance with the invention by providing a microprocessor execution unit in which functions are distributed among different logic blocks on the chip so that the blocks function independently of each other. Arithmetic operations are performed by a data manipulation unit which contains registers and an arithmetic capability, and which is controlled by a math sequencer which sequences through various microinstructions for performing arithmetic operations.

Memory references are performed by a reference-generation unit which contains base-and-length registers and has an arithmetic capability, in order to generate and check addresses in a main-memory address space. The reference-generation unit is controlled by an access sequencer which sequences through various microinstructions for accessing the off-chip main memory and an on-chip operand stack.

In accordance with an aspect of the invention, means are provided in the access sequencer to interface with main memory and to fetch information, such as a macroinstruction, to monitor interface lines from main memory, and to signal the instruction unit over an interchip bus when the fetch is complete and the execution unit is ready to accept a new microinstruction.

In accordance with a further aspect of the invention, means are provided in the math sequencer to decode an arithmetic microinstruction requiring a variable number of clock cycles to complete, to sequence a state machine through the cycles necessary to execute the function specified by the microinstruction, and to signal the instruction unit over the interchip bus when the execution is complete. By signaling the instruction unit a fixed-time period prior to actual completion (such as one-cycle prior), the instruction unit has time to present a new microinstruction for execution, thus avoiding idle cycles.

The invention has the advantage that by separating the arithmetic and memory-access functions, the execution unit is able to stop in the middle of a microinstruction flow, to do a memory fetch as directed by a microinstruction sent by the instruction unit, to signal the instruction unit when the fetch is complete, and then to return to the microinstruction flow to complete the arithmetic operation. This ability allows the pipeline comprising the instruction decoder, the microinstruction sequencer (both on the instruction unit chip) and the microinstruction execution unit (on the execution unit chip) to remain full by enabling the execution unit to fetch the next macroinstruction which the instruction unit is able to decode, while the macroinstruction sequencer/microinstruction execution unit pair complete the previous macroinstruction.

In accordance with a still further aspect of the invention, a fault bus is provided between the execution unit and the instruction unit. When the execution unit recognizes a fault, a fault encoding is placed on this bus and a fault signal is asserted during the same cycle that a fault encoding is asserted on the bus, to alert the instruction unit that a fault has occurred so that the instruction unit can latch the fault-encoding information. A done line is asserted, the cycle immediately following the assertion of the fault line, in order to cancel any variable-length microinstruction that the instruction unit may have started prior to recognizing the fault.

BRIEF DESCRIPTION OF THE DRAWINGS

The foregoing and other objects, features, and advantages of the invention will be apparent from the following detailed description of a preferred embodiment of the invention, as illustrated in the accompanying drawings wherein.

TABLE OF CONTENTS

Figure 1:
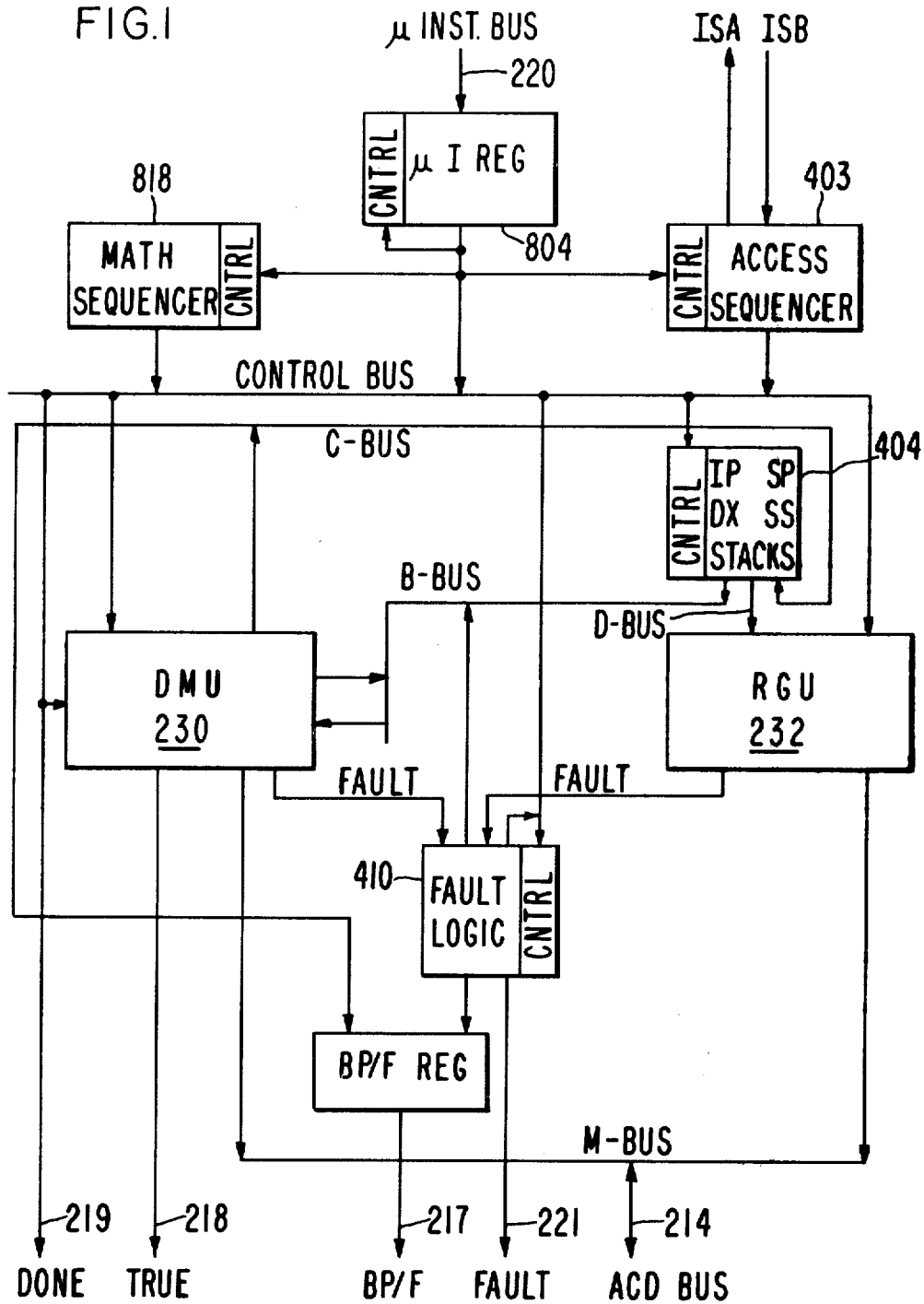
FIG. 1 is a functional block diagram illustrating the major components of the execution unit of the present invention.

Introductory Description of the Invention
Background of the Invention
Brief Summary of the Invention
Brief Description of the Drawings
Table of Contents
1. Introduction
2. General Bus and Timing Structure
   2.1 Clocking Scheme
   2.2 Internal Buses
      2.2.1 DMU Source and Destination Buses (A15 . . . A$\phi$, B15 . . . B$\phi$, C15 . . . $\phi$)
      2.2.2 RGU Displacement Bus (D15 . . . D$\phi$)
      2.2.3 Memory Interface Bus (M15 . . . M$\phi$)
      2.2.4 PLA Input Control Bus
         2.2.4.1 Microinstruction Bus (MI15 . . . MI$\phi$)
         2.2.4.2 State Bus (T1 . . . T$\phi$)
         2.2.4.3 Access Sequencer Bus (ASxxxxxx)
         2.2.4.4 Math Sequencer Bus (MSxxxxxx)
      2.2.5 Microinstruction Register and State PLA
      2.2.6 Microinstruction Decoder Control PLAs
3. Data Manipulation Unit (DMU)
   3.1 Operand Queues (ADEQ, BDEQ) and Exponent Stack
      3.1.1 ADEQ
      3.1.2 BDEQ
      3.1.3 Exponent Stack
   3.2 Operand Flags
      3.2.1 Operand Flag Sequencing Flip-Flops
      3.2.2 Temporary Operand Flags
   3.3 Arithmetic Logic Unit (ALU)
      3.3.1 ALU Input Mux
      3.3.2 ALU Logical Combiner and Adder
      3.3.3 ALU Master Slave Register
      3.3.4 ALU Shift Register
   3.4 Operational Flags
      3.4.1 Arithmetic and Logical Flags (ZERO, ONES, LSB, SIGN)
      3.4.2 Arithmetic-Only Flags (CARRY, COMP)
      3.4.3 Floating Point Flags
      3.4.4 Context Switch Time-Loaded Flags
      3.4.5 Process Dispatch Time-Loaded Flags
      3.4.6 Lookahead Flag
   3.5 Flag Multiplexer
   3.6 Extractor
      3.6.1 Shift-Count Register
      3.6.2 Conditional-Shift Decrementer
   3.7 Significant Bit Finder
   3.8 Constant ROM
   3.9 Register RAM
   3.10 C-Bus Mask Circuit
   3.11 Decoded VVV to C-Bus Circuit
   3.12 Math Algorithm FIFO
   3.13 System Timing Functions
      3.13.1 System Timer Incrementer
      3.13.2 Process Timeout Decrementer
4. Displacement Stacks
   4.1 Segment Selector Stack
   4.2 Displacement Stack
   4.3 Instruction Pointer Stack
   4.4 Stack Pointer Stack
5. Reference Generation Unit (RGU)
   5.1 Base and Length File
      5.1.1 Data Cache
      5.1.2 Segment Table Cache
   5.2 Base and Length Register
   5.3 Length Verification Hardware
   5.4 Address Generator and Specification Register
   5.5 Rights Checking Logic
6. Math Sequencer
   6.1 Sequencer PLA
      6.1.1 Control ROM Address Register (RAR5 . . . RAR$\phi$)
      6.1.2 Math Sequencer Enable Flip-Flop (MSEN)
      6.1.3 Loop Count Decrementer
   6.2 MOD Register
   6.3 Control ROM
7. Access Sequencer
8. Fault Handling
   8.1 Fault-Encoding Register
   8.2 Fault-Disable Flip-Flop 8.3 Address-Development Faults during Instruction Fetches
9. Processor Interface
10. Execution Unit/Instruction Unit Interface
11. Typical Execution Unit Operation

1.0 INTRODUCTORY DESCRIPTION OF THE INVENTION

The following introductory description broadly describes the various elements of the execution unit in which the invention is embodied, and provides an introduction to some of the terminology used throughout the following specification. A data processing system of the type in which the present invention may be embodied is more fully described in the above-identified Stephen R. Colley, et al patent. FIGS. 5 and 6 of the Colley, et al Patent illustrate how the execution unit of the present invention is interconnected with the remainder of the data-processing system. The execution unit is one part of a two-part generalized data processor. The other part is an instruction unit which communicates with the execution unit over an interunit bus. The instruction unit is more fully described in the Colley, et al patent and the Richardson, et al patent application. The interface between the instruction unit/execution unit pair and the remainder of the data processing system is more fuly described in the above-identified Daniel K. Jackson patent. for ease of understanding, the reference numerals used in the Colley, et al patent to identify the various functional data blocks are utilized throughout the following specification to identify the same logic blocks.

Referring now to FIG. 1, the execution unit is comprised of two main logical portions: the data manipulation unit (DMU), 230, controlled by a math sequencer (818), and a reference-generation unit (RGU), 232, controlled by an access sequencer (403). The execution unit interacts with two external buses: the address/control/-data bus (ACD) and the interunit bus.

The ACD bus (214) may carry address, control, or data during different times in the bus transaction. Bus interface logic within the access sequencer (403) determines the status of the ACD bus lines by monitoring ISA and ISB, as more fully described in the above-identified Daniel K. Jackson patent.

The interunit bus is the communication link between the execution unit and the instruction unit. The interunit bus carries microinstructions and logical address information from the instruction unit to the execution unit. In addition, the interunit bus also carries status and fault information from the execution unit to the instruction unit and bit-pointer information for an instruction decoder on the instruction unit. The interunit bus has two main components: the microinstruction bus (220) and the BP/F bus (217). In addition, there is also a true line (218) which returns a branch-on-condition bit to the instruction unit from the execution unit, and a fault line which signals that a fault has been detected by the execution unit. A done line (219) is provided to signal the instruction unit when a variable cycle microinstruction execution has been completed by the execution unit.

The microinstruction bus (220) is a unidirectional bus from the instruction unit to the execution unit. The bus is used to transfer microinstructions and logical address data to the execution unit. Under normal operation, microinstructions are read from a microprogram ROM on the instruction unit and transferred to the execution unit over the microinstruction bus.

The data manipulation unit (DMU), 230, contains the registers and arithmetic capability to perform the functions of the macroinstructions decoded by the instruction unit. The math sequencer (818) contains all the sequencing hardware to execute 16 variations of a perform-operation microinstruction received from the instruction unit. The math sequencer controls the operation of the DMU.

The reference generation unit (RGU), 232, contains the base-and-length registers and the arithmetic capability to generate and check addresses in the main-memory-segmented address space. The RGU is controlled by the access sequencer (403) which contains all the necessary hardware to access external main memory and the on-chip operand stack (404). The access-sequencer/-RGU pair, communicate and control transfers to main memory over the ACD bus (214) under control of lines ISA and ISB.

Several faults are detected by the fault logic (410) upon execution of certain microinstructions. When this occurs, the execution unit enters an internal-fault state and sends a four-bit code on the BP/F bus (228) to the instruction unit indicating the fault type and asserts the fault line (221). This fault encoding is used by the instruction unit to select the starting address of a fault microinstruction flow from a fault ROM on the instruction unit. When a fault occurs, the microinstruction flow to the execution unit is interrupted, and the fault microinstruction flow is sent to the execution unit. When the fault flow finishes, the execution of the interrupted flow may be resumed.

The BP/F bus (217) is also used for the execution of branches. The program counter for the instruction unit-/execution unit pair is stored as two pieces; the double-byte pointer is stored on the execution unit and the bit pointer is stored on the instruction unit. In the case of a branch, the execution unit may have to do some calculations on the entire program counter. In order to do this, the instruction unit may transfer the bit pointer to the execution unit over the microinstruction bus (220) and new bit-pointer information may be returned to the instruction unit on the BP/F lines. The instruction unit always assumes that the BP/F lines carry bit-pointer information, unless the fault line is asserted. If fault is asserted, the information on the BP/F lines is interpreted as a fault encoding. BP/F is also used to transfer the four least significant bits of the top of the operand stack (404) to the bit pointer if the branch is through the top of the stack.

The remaining lines in the interchip bus are the true line and the done line.

The true line is used whenever a conditional branch in the microcode is performed. The microprogram in the instruction unit performs the operation that it wishes to branch on, and then requests that the execution unit return the proper condition flag (on the true line) where it is latched in the instruction unit. The instruction unit then does the branch based on that condition.

The done line (219) is used to return a done signal to the instruction unit during execution of variable cycle microinstructions. The instruction unit detects that a variable cycle microinstruction is being transferred to the execution unit and loops on that microinstruction until the done line indicates that the execution unit is about to complete the microinstruction. The done signal is sent out by the execution unit one-half cycle before it will complete the microinstruction. This allows the instruction unit to have the next microinstruction ready on the microinstruction bus (220) so that no cycles are lost.

2.0 GENERAL BUS AND TIMING STRUCTURES

Figure 3:
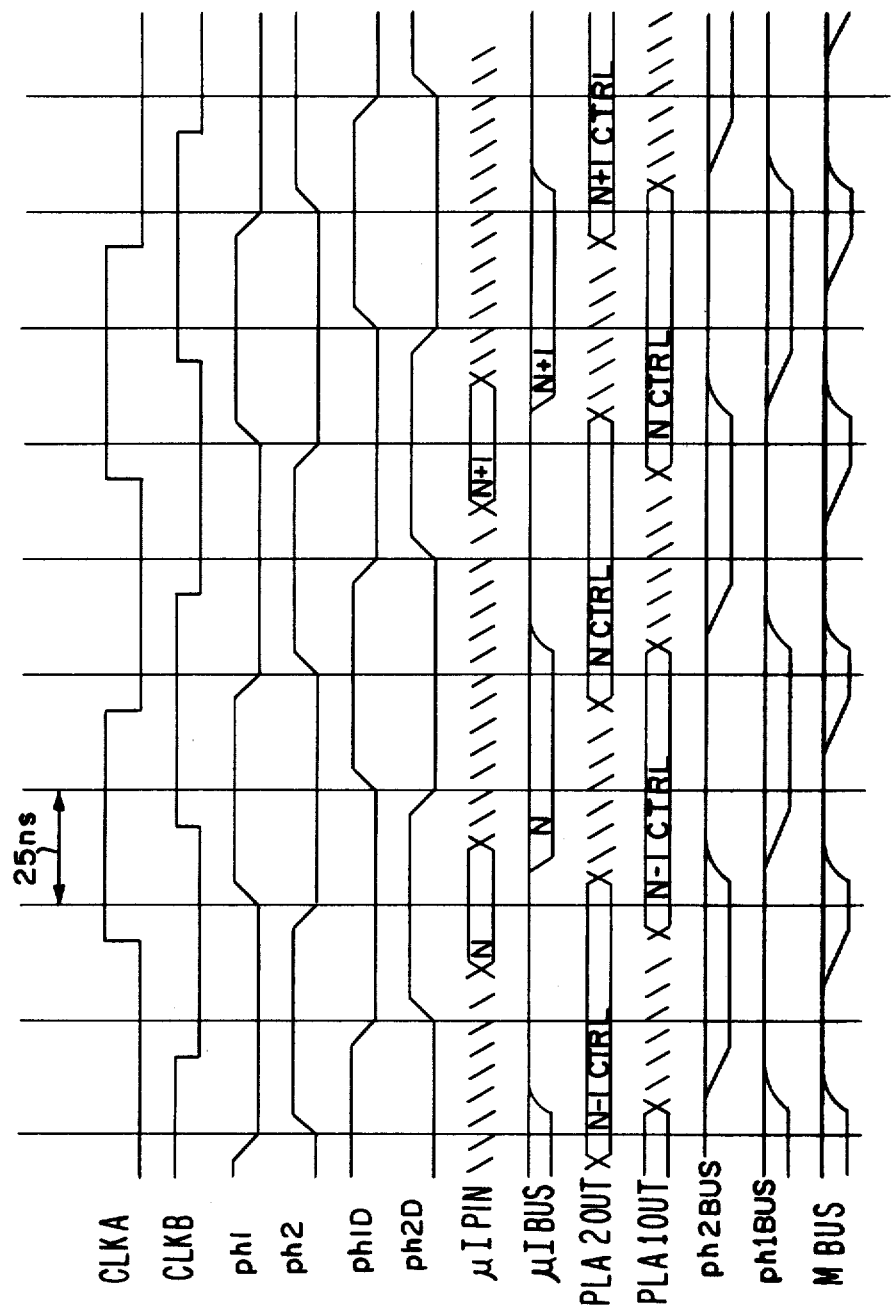
FIG. 3 is a timing diagram illustrating the general timing relationship between various components of the system shown in FIGS. 1 and 2.

The general internal timing of the Execution Unit relative to CLKA and CLKB is shown in FIG. 3. The following subsections describe in detail the various bus structures.

2.1 Clocking Scheme

A four-phase clocking scheme is used on the Execution Unit. Ph1 and ph2 are nonoverlapping signals generated from CLKA (ph1 is high when CLKA is high, and ph2 is high when CLKA is low). Ph1D and ph2D are nonoverlapping signals delayed 90 degrees from ph1 and ph2 respectively, and are generated from CLKB (ph1D is high when CLKB is high, and ph2D is high when CLKB is low). A microcycle is defined to start at the leading edge of ph1 and end at the falling edge of ph2.

2.2 Internal Buses

The Execution Unit employs a multiple internal bus structure to obtain a higher degree of parallelism and to keep the capacitive loading on a given bus to a reasonable level. All buses are assumed to be valid through one or two buffering inverters one-quarter cycle following the leading edge of the phase which drives the bus pulldowns. The following sections describe the timing and generic uses of each of the internal buses.

2.2.1 DMU Source and Destination Buses (A-Bus and B-Bus)

The Data Manipulation Unit (DMU) has two 16-bit source buses, the A-bus and the B-bus (A15 ... A$\phi$, B15 ... B$\phi$) and one 16-bit destination bus, the C-bus (C15 ... C$\phi$). All three buses are of the precharge-conditionally discharge type. Both source buses are driven during ph2 and the destination bus is driven during the following ph1. One exception to this is for multiply operations: the top two bits of the destination bus (C15, C14) are driven during the coincidence of ph1 and ph1D. Elements which drive the source buses are registers, stacks, double-ended queues, and elements which contain source information. Elements which drive the destination bus are function blocks such as the ALU, Extractor and the like. The source buses are sources for information to the function blocks which drive the destination bus, and likewise, the destination bus is the source for information to the various registers, stacks, etc. The details that describe which bus connects to which blocks in particular, are described in the block sections themselves.

2.2.2 RGU Displacement Bus (D15 ... D$\phi$)

A 16-bit displacement bus, the D-bus (D15 ... D$\phi$) is used as a connection between one of the four displacement stacks and the Address Generator and Length Verification hardware. This bus is also of the precharge (during ph1) conditionally-discharge (during ph2) type.

2.2.3 Memory Interface Bus (M15 ... M$\phi$)

A 16-bit bus is used to communicate information from/to the DEQs and the ACD pins. This bus, the Memory Interface Bus, M-bus (M15 ... M$\phi$), is also used to communicate address and access specification information to the ACD pins. It is also used to transfer data from the DEQs to the base and length file. The M-bus is of the precharge (during ph1.ph2D+ph2.ph1D) conditionally-discharge type (during ph1.ph1D, or during ph2.ph2D). The reason that this bus must be able to transfer two pieces of data during a given cycle is that for write accesses which are bound for the operand stack and the write data that is being transferred to memory as opposed to on-chip, the data must be written through the on-chip portion of the operand stack. That is, the on-chip portion of the operand stack is gated to M15 ... M$\phi$ and on to the ACD pins during ph2.ph2D of a given cycle, and the write data from the DEQ is gated to M15 ... M$\phi$ and onto the on-chip operand stack, replacing the old value during the following ph1.ph1D.

2.2.4 PLA Input Control Bus

Several buses comprise what is termed the PLA Input Distributed Control bus. Basically, any signal which is an input to one of the distributed microinstruction decoder PLAs is a member of this bus. The separate buses which comprise this group are discussed in the following sections.

2.2.4.1 Microinstruction Bus (MI15 ... MI$\phi$)

The microinstruction Bus (MI15 ... MI$\phi$) is the internal 16-bit precharge (during ph2) conditionally-discharge (every ph1) bus which communicates between the microinstruction register and the microinstruction decoder PLAs. For multicycle microinstructions, this bus contains the same data for each cycle of a given microinstruction.

2.2.4.2 State Bus (T1 ... T$\phi$)

The State Bus (T1 ... T$\phi$) is a two-bit precharge (during ph2) conditionally-discharge (during ph1) bus which gives the current cycle of a given microinstruction. The encodings for the various types of microinstructions are enumerated below:

1. Single-cycle microinstruction: T1, T$\phi$=$\phi\phi$.
2. Double-cycle microinstruction: T1, T$\phi$=$\phi\phi$, $\phi$1.
3. Triple-cycle microinstruction: T1, T$\phi$=$\phi\phi$, $\phi$1, 11.
4. Perform-operation microinstruction: T1, T$\phi$=$\phi\phi$, $\phi$1, $\phi$1, $\phi$1.
5. Nonstack-access microinstructions: T1, T$\phi$=$\phi\phi$, $\phi$1, 11, 1$\phi$, 1$\phi$, ... , 1$\phi$.
6. Pop microinstruction (on-chip only): T1, T$\phi$=$\phi\phi$, $\phi$1, 11.
7. Pop microinstruction (off-chip): T1, T$\phi$=$\phi\phi$, $\phi$1, 11, $\phi\phi$, $\phi$1, 11, 1$\phi$, 1$\phi$, ... , 1$\phi$.
8. Push microinstruction (on-chip only): T1, T$\phi$=$\phi\phi$, $\phi$1, 11, 1$\phi$.
9. Push microinstruction (ff-chip): T1, T$\phi$=$\phi\phi$, $\phi$1, 11, 1$\phi$, 1$\phi$, ... , 1$\phi$.
10. Push microinstruction (part on-chip, part off-chip): T1, T$\phi$=$\phi\phi$, $\phi$1, 11, 1$\phi$, $\phi\phi$, $\phi$1, 11, 1$\phi$, ... , 1$\phi$.

Note that alternate mnemonics for the State Bus are:
S$\phi$:=T1, T$\phi$=$\phi\phi$
S1:=T1, T$\phi$=$\phi$1
S2:=T1, T$\phi$=11
S3:=T1, T$\phi$=1$\phi$

2.2.4.3 Access Sequencer Bus (ASxxxxxx)

The Access Sequencer Bus, 801 (ASxxxxxx) is an 8-bit bus used to control the various functional blocks which are used to access memory. Items 1–5, listed below, are timing signals. Items 6–8, listed below, are flags which dictate the state of the access relative to memory and the on-chip operand stack (828). The five timing signals are of the precharge (during ph2) conditionally-discharge (during ph1) type. The other three signals are driven and are valid all during ph1.

1. ASQPOP: Causes ADEQ (400) or BDEQ (402) to be read or popped and gated to the ACD pins or to the on-chip operand stack (828). MI10, MI9 specify which DEQ and whether to read or pop the DEQ. Multidouble-byte accesses require that pop be specified.

2. ASQDR: Causes ADEQ or BDEQ to be pushed or dropped with the data that has just been transferred to the M Bus from the ACD pins or from the on-chip operand stack. MI10, MI9 specify which DEQ and whether or not to push or drop the information into the DEQ. The operand flags are also loaded appropriately via assertion of this signal if drop is specified by MI10, MI9.

3. ASSSPSH: Causes the SSSTK (404) to be pushed with the data that has just been transferred to the ACD pins from memory.

4. ASEXPPS: Causes the EXPSTK (406) to be pushed with the exponent field of the temporary real operand which has just been transferred to the M Bus from the ACD pins or from the on-chip operand stack. The operand flags are also loaded appropriately via assertion of this signal if drop is specified by MI10, MI9.

5. ASEXPP: Causes the EXPSTK to be popped and sent outbound to either the ACD pins or to the on-chip operand stack. The SB flag is appended to bit 15 as the EXPSTK is popped off.

6. ASACCSTK: This flag, when asserted, indicates that the current stack access is in the memory portion of the access as opposed to the on-chip portion of the access. It is used in conjunction with the state bus to determine which cycle of the stack access is current.

7. ASFUL: This flag designates whether the on-chip operand stack has valid information in it. It is implemented as a two-deep by one-bit stack just as the SPSTK is for fault-recovery reasons.

8. ASOGTFUL: This flag, when asserted, designates that the operand length specified in the pop microinstruction is greater than the number of double bytes in the on-chip operand stack. If so, the pop microinstruction must first go to memory for the first part of the operand and pick up the last double byte (if there is one) from the on-chip operand stack.

2.2.4.4 Math Sequencer Bus (MSxxxxxx)

The Math Sequencer Bus, 800 (MSxxxxxx), is a 28-bit-driven bus (valid during ph1) which is the output of the math sequencer control ROM (802). These signals are used to control the DMU-function blocks during the perform-operation microinstruction. Each signal is defined below.

MSAQOP: Causes assertion of @ADRP, @APP, and @AQ@A which effects a recirculation of ADEQ.

MSBPSH: Causes assertion of @BPSH which effects pushing C15 . . . C$\phi$ onto BDEQ.

MSBDR: Causes assertion of @BDR which effects dropping C15 . . . C$\phi$ into BDEQ.

MSBPP: Causes assertion of @BPP, and @BQ@B which effects popping BDEQ up one level and gating it to B15 . . . B$\phi$.

MSZ@B: Causes assertion of @RDROM which gates zero to B15 . . . B$\phi$.

MSFDR: Causes assertion of @FDR, which effects dropping C15 . . . C$\phi$ into the FIFO.

MSFPP: Causes assertion of @FPP, which effects popping the FIFO up one level and gating it to B15 . . . B$\phi$.

MSAU@M: Causes assertion of @AU@M, which loads ALU17 . . . ALU$\phi$ into the Master 17 . . . Master$\phi$.

MSSHORT: Causes assertion of @SHOR, which loads Master17 . . . Master2 to Slave15 . . . Slave$\phi$.

MSM@SL: Only asserted in coincidence with MSSHORT and MSS@C, which effects a concatenation of ALU1 . . . ALU$\phi$, and Slave13 . . . Slave$\phi$ to C15 . . . C$\phi$, completing the two-bit right shift across a double-byte boundary. (The slave register contains ALU data from the previous cycle.)

MSM@B: Causes assertion of @M@B, which gates Master15 . . . Master$\phi$ to B15 . . . B$\phi$.

MSS@C: Causes assertion of @S@C, which gates Slave15 . . . Slave$\phi$ to C15 . . . C$\phi$ if MSM@SL is unasserted. See MSM@SL definition if asserted.

MSB@SR: Loads B15 . . . B$\phi$ into the shift register (SR15 . . . SR$\phi$).

MSSR@C: Gates SR15 . . . SR$\phi$ to C15 . . . C$\phi$.

MSSR2: Causes the shift register to shift right two bits.

MSSL1: Causes the shift register to shift left one bit.

MSSL2: Causes the shift register to shift left two bits.

MS1ST: Designates the first double byte of the present operation cycle.

MSSHAL: Enables shifting the A-bus left one to effect a multiply-by-two at the ALU Input Mux. The shift is controlled by the multiply control bits (MCB2 . . . MCB$\phi$).

MSSHAB: Shifts both the A-bus and the B-bus left by two bits. This signal is used in the square root algorithm.

MSSHB: Shifts the B-bus left one bit. This signal is used in the divide and remainder algorithms.

MSA16@C: Loads the control flag (CF) with ALU16 to control subsequent reduction cycles in divide and remainder operations. This signal also clears the REDCY1 flag.

MSC18@C: Loads the ALU cy18 into the control flag to control subsequent reduction cycles in square root operations. This signal also clears the REDCY1 flag.

MSLDF: Causes assertion of @LDF, which loads the ALU flags from the C-bus.

MSCLDF: Causes assertion of @LDF, which loads the ALU flags from the C-bus.

MSROC: Indicates to the ALU control logic that a remainder-ordinal-correction cycle is taking place.

MSRIC: Indicates to the ALU control logic that a remainder-integer-correction cycle is taking place.

MSDIC: Indicates to the ALU control logic that a divide-integer-correction cycle is taking place.

2.2.5 Microinstruction Register and State PLA

A 16-bit microinstruction register, 804, (MIR) is used to buffer the current microinstruction. The State PLA which keeps track of the current cycle of the microinstruction via the state flip-flops and the state bus also controls when to load the MIR. Effectively, the MIR is loaded when the state returns to T1, T$\phi$=$\phi\phi$, i.e., upon assertion of @TCLR and unassertion of @INH. (@INH is used to inhibit loading the MIR during stack-access microinstructions since the state T1, T$\phi$=$\phi\phi$ is used during the middle of these instructions in certain instances.) The MIR is also loaded if the previous state was T1, T$\phi=\phi\phi$ and the next state is T1, T$\phi=\phi\phi$, i.e., if the current microinstruction is a single-cycle microinstruction. The signal @TINC advances the state flip-flops to its next state if @TCLR is unasserted. Notice that the states advance in a gray-code fashion and not in binary.

The fault-handling mechanism causes the MIR to be forced to the value 11111 00 10100 BBBB which is defined to be the internal-fault state. When this value is in the MIR the Execution Unit returns to a null state and waits for a reset-processor or a reset-fault-state microinstruction. Unless one of these two microinstructions is asserted from the Instruction Unit, the Execution Unit will idle indefinitely. Note that the bottom-four bits of the MIR are not loaded during the fault state. This is necessary to keep the address of the base/-length file during altered faults.

Immediate data is transferred to the C-bus via assertion of @MI@C. Also immediate data for the test-segment-type microinstruction is transferred to B7 ... B$\phi$ via assertion of @MI@B.

Since immediate transfers of 16-bit quantities across the MI-bus (220) and the MIR can assume an arbitrary value (i.e., an immediate transfer microinstruction) at power-up, the condition which causes the Execution Unit to come out of its faulted state is qualified by the unassertion of @MI@C which occurs during the cycle of the immediate transfer. Therefore, since the longest immediate transfer microinstruction is three cycles (transfer logical address), the reset processor microinstruction must be asserted for four consecutive cycles at powerup. In the normal course of things (i.e., the MIR is well defined) only one reset-processor microinstruction is required to reset the Execution Unit.

2.2.6 Microinstruction Decoder Control PLAs

Various control PLAs are distributed throughout the Execution Unit for decoding microinstructions. The PLAs are divided into two types: Type 1 PLAs are dynamic PLAs and assert their outputs during the ph1 following the current cycle of the microinstruction being decoded. Type 2 PLAs are static PLAs and assert their outputs during the ph2 of the present cycle of the microinstruction being decoded. (See timing diagram, FIG. 3).

3.0 DATA MANIPULATION UNIT (DMU)

This section describes the register files and function blocks required to manipulate data within the Execution Unit. These areas comprise the Data Manipulation Unit (230, FIG. 2).

3.1 Operand Queues (ADEQ, BDEQ) and Exponent Stack

Two double-ended queues, ADEQ (400), and BDEQ (402), and the Exponent Stack (406) are used for storing source operands from memory and results to be written to memory. In addition the two DEQs are used as the main Data Manipulation registers for all arithmetic and logical operations.

3.1.1 ADEQ

ADEQ is a 16-bit wide by 6 deep, double-ended queue. Six validity bits are used to store the state of valid information on the DEQ. In essence one bit is associated with each register and if that bit is set, then the associated register contains valid data.

The topmost register of ADEQ is gated onto the A-bus via assertion of @AQ@A. ADEQ is popped up one level via the assertion of @APP. Popping causes zeros to be loaded into the bottommost register regardless of the state of the validity bits. ADEQ is pushed down one level and the topmost register is written from the C-bus via assertion of @APSH. Pushing data onto a full DEQ causes the data in the bottommost register to be lost. Data is dropped onto and written from the C-bus via assertion of @ADRP. After a drop operation all registers which are marked invalid contain the same data at the bottommost register which is marked valid. Dropping into a full DEQ has no effect on any data in any register and the data dropped is lost. All validity bits are marked invalid via assertion of @AFL.

Outbound data to memory or to the base-and-length file (430) travels via the C-bus and the M-bus. Assertion of @A@C gates ADEQ data from the A-bus to the C-bus and causes assertion of C@M which gates the C-bus to the M-bus.

The perform-operation microinstruction requires special functions of ADEQ. For multiply, divide, and remainder, ADEQ must recirculate itself (i.e., the DEQ must be popped up one level, read onto the A-bus, and dropped back onto itself. This is accomplished via assertion of @AQ@A, @APP, and MSAQOP simultaneously.

3.1.2 BDEQ

BDEQ (402) is a 16-bit wide by 4 deep, double-ended queue. Four validity bits are used to store the state of valid information on the DEO. In essence one bit is associated with each register and if that bit is set, then the associated register contains valid data.

The topmost register of BDEQ is gated onto the B-bus via assertion of @BQ@B. BDEQ is popped up one level via the assertion of @BPP. Popping causes the zeros to be loaded into the bottommost register regardless of the state of the validity bits. BDEQ is pushed down one level and the topmost register is written from the C-bus via assertion of @BPSH. Pushing data onto a full DEQ causes the data in the bottommost register to be lost. Data is dropped onto and written from the C-bus via assertion of @BDRP. After a drop operation all registers which are marked invalid contain the same data as the bottommost register which is marked valid. Dropping into a full DEQ has no effect on any data in any register. All validity bits are marked invalid via assertion of @BFL.

Outbound data to memory or to the base-and-length file travels via the C-bus and the M-bus. Assertion of @B@C gates BDEQ data from the B-bus to the C-bus and causes assertion of C@M which gates the C-bus to the M-bus.

3.1.3 Exponent Stack

The Exponent Stack (EXPSTK, 406) is a 15-bit wide by 2-deep stack that is used to store exponent information for both source data and resultant data of temporary real-data types. The exponent stack is popped up one level and read onto the B-bus via assertion of @XPPP1 and has either a zero (in the case of a register OP DEQ to DEQ, or an ADD to exponent stack microinstruction via assertion of @XPPP2) or the operand-sign flag, SB (in the case of an access-memory microinstruction via assertion of ASEXPP) appended to B15 of the B-bus. The exponent stack is pushed down one level and written from the C-bus via assertion of @XPPSH.

When reading temporary real information from memory, the exponent stack looks like the low-order-15 bits of the fifth register in either DEQ. (Sign information is stored in the operand-sign flag, SA or SB). When writing temporary real information to memory the exponent stacker looks like the low-order-15 bits of the fifth register of BDEQ only, since writes can only occur from BDEQ. (SB, operand-sign flag, is appended to bit 15.)

3.2 Operand Flags

When an operand is loaded into a DEQ (400, 402) from memory, five flags are loaded with information about that operand. The following list describes the flags and the operations that can be performed on them once they have been loaded. Note that all operand flags are undefined for 48-bit data types. Section 3.2.1 describes how they are loaded.

SA, SB: The operand-sign flags, SA and SB, indicate the most significant bit of the operand for all data types except character. For character operands these flags are loaded with zero. Assertion of @ZSA clears the SA flag. Assertion of @ZSB clears the SB flag. Assertion of @INVSA inverts the SA flag. Assertion of @FLGXCH exchanges SA and SB. Assertion of @SR@SB loads the exclusive or of SA and SB into SB. Assertion of @Z@SB loads the function:

(SA) (SB)+[(SA xor SB) (RND1) (not RND$\phi$)]

into SB.

OPAEZ, OPBEZ: The operand-equals-either-(plus or minus)-zero flags, OPAEZ and OPBEZ, indicate that the exponent and the mantissa portions of the operand are zero for the 32-bit-data length. For other operand lengths these flags are undefined.

OPAZ, OPBZ: The operand-equals-zero flags, OPAZ and OPBZ, indicate an all-zero value for 8-, 16-, and 32-bit operand lengths. For 64- and 80-bit lengths these flags indicate plus or minus zero. Assertion of @FLGXCH exchanges OPAZ and OPBZ. Assertion of @Z@Z loads OPAEZ into OPAZ and OPBEZ into OPBZ.

INVA, INVB: The invalid flags, INVA and INVB, indicate an invalid operand for the three floating-point-data lengths. For other operand lengths these flags are undefined. Invalid operands are values with an exponent field that is all ones, or values with an exponent field of all zeros and a mantissa field that is not all zeros.

UNNA, UNNB: The unnormalized flags, UNNA and UNNB, indicate valid nonzero temporary real operands whose most significant mantissa bit is zero. Since the UNNA and UNNB flags are cleared at macroinstruction boundaries and only temporary read-operand lengths load them, the UNNA and UNNB flags can be assumed unasserted for all other data types. Assertion of @FLGXCH exchanges UNNA and UNNB. Assertion of @UAB@B loads (UNNA) (UNNB) into UNNB. Assertion of §ZUN clears the UNNA and UNNB flags.

3.2.1 Operand Flag Sequencing Flip-Flops

The operand-flag-sequencing flip-flops, AFTADB1 and MNTSHPT, indicate the fields which are currently being loaded from memory according to the following table. These flip-flops are initialized via assertion of @FLGZ and are updated via assertion of @LAFL or @LBFL. With the information from these two flip-flops along with the signals @LAFL, @LBFL and @AQLDM, all of the operand flags and the temporary operand flags can be loaded correctly.

| For 32-bit operand length: | MNTSHPT | AFTADB1 |
|---|---|---|
| 1st DB | 0 | 0 |
| 2nd DB | 1 | 1 |
| For 64-bit operand length: | MNTSHPT | AFTADB1 |
| 1st DB | 0 | 0 |
| 2nd DB | 0 | 1 |
| 3rd DB | 0 | 1 |
| 4th DB | 1 | 1 |
| For 80-bit operand length: | MNTSHPT | AFTADB1 |
| 1st DB | 0 | 0 |
| 2nd DB | 0 | 1 |
| 3rd DB | 0 | 1 |
| 4th DB | 0 | 1 |
| 5th DB | 0 | 1 |

3.2.2 Temporary Operand Flags

Four temporary operand flags check data as it comes in from memory for certain values of fields of floating-point operands and are used to set the operand flags defined previously. These temporary flags are defined in the following list.

MANTZ: This flag is asserted if the mantissa field of the floating-point operand is zero.

MANTMSB: This flag is asserted if the most significant mantissa bit of a temporary real operand is zero.

EXPO: This flag is asserted if the exponent field of the floating-point operand is all ones.

EXPZ: This flag is asserted if the exponent field of the floating-point operand is all zeros.

3.3 Arithmetic Logic Unit (ALU)

This section describes the 18-bit ALU (432). The ALU has four main logical units: the ALU input mux (809), the ALU logical combiner and adder (432), the master-slave register (416), and the shift register (806). Nominally only 16 bits of the ALU are used. The high-order two bits are used to support the perform-operation microinstructions.

3.3.1 ALU Input Mux

The ALU input mux (809) nominally passes the A-bus and B-bus to the input of the ALU logical combiner and adder. (The inputs to the logical combiner and adder are AUINA17 . . . AUINA$\phi$, and AUINB17 . . . AUINB$\phi$, from the input mux.) For the perform-operation microinstruction, however, scaling is sometimes required, and it is here that the appropriate scaling is done.

Assertion of SHAL gates SAX to AUINA17, A15 . . . A$\phi$ to AUINA16 . . . AUINA1, and SA15 to A$\phi$. Assertion of MSSHAB gates A15 . . . A$\phi$ to AUINA17 . . . AUINA2, and either SA15 . . . SA14 to AUINA1 . . . AUINA$\phi$ is MS1ST is unasserted or notCF to AUINA1 and a one to AUINA$\phi$ is MS1ST is asserted. Assertion of MMSHAB also gates B15 . . . B$\phi$ to AUINB17 . . . AUINB2, and either SB15 . . . SB14 to AUINB1 . . . AUINB$\phi$ if MS1ST is unasserted, or SR15 . . . SR14 to AUINB1 . . . AUINB$\phi$ if MS1ST is asserted. Assertion of MSSHB gates B15 . . . B$\phi$ to AUINB16 . . . AUINB1 and SR15 to AUINB$\phi$.

3.3.2 ALU Logical Combiner and Adder

The ALU logical combiner (432) can generate all of the sixteen logical functions of two variables. The adder generates the sum of the two input values. Subtraction is performed by forcing the logical control lines to exclusive-or (add uses equivalence), thus effecting an inversion of one of the inputs. The input carry is also forced to a one, thus completing the complement and increment of one of the inputs. (Note that the direction of subtract is B-A. A-B is not supported.)

The inputs to the ALU logical combiner and adder are AUINA17 . . . AUINA$\phi$, and AUINB17 . . . AUINB$\phi$ from the ALU input mux, the four logic control lines L3 . . . L$\phi$, the carry-disable AUCYDSBL, and the input-carry AUCY$\phi$. The logical combiner gates the lower-order-16 bits to C15 . . . C$\phi$ via assertion of @AU@C. The adder outputs the 18-bit sum (ALU17 . . . ALU$\phi$) to the master-slave register (416), and the necessary carry lines to set the flags (436).

The following table summarizes the ALU combiner control.

| LLLL 3210 | Function |
|---|---|
| 0000 | ZERO |
| 0001 | (notA) (notB) |
| 0010 | (notA) (B) |
| 0011 | notA |
| 0100 | (A) (notB) |
| 0101 | notB |
| 0110 | A xor B; Subtract |
| 0111 | notA + notB |
| 1000 | (A) (B) |
| 1001 | A equ B; Add |
| 1010 | B |
| 1011 | NotA + B |
| 1100 | A |
| 1101 | A + not B |
| 1110 | A + B |
| 1111 | ONE |

3.3.3 ALU Master Slave Register

The ALU master-slave register (temporary register-416) is an 18-bit pipeline register for the ALU adder. Nominally the 18-bit adder output is loaded into the 18-bit master during ph1 (the upper-2 bits are normally not used), the lower-16 bits of the master are then transferred to the 16-bit slave the following ph2, and gated to the C-bus the following ph1. Assertion of @S@C gates the slave to C15 . . . C$\phi$.

Deviation from the above-nominal use of the master-slave register is done to support the perform-operation microinstructions. First, multiply requires the use of the full-18 bits of the ALU. Thus, the output of the master is shifted right 2 bits as it is loaded into the slave to convert the 18-bit result back to a 16-bit result via assertion of @SHOR. Also for multidoublebyte, multiply concatenation across double-byte boundaries is necessary, thus assertion of MSM@SL (see Section 2.2.4.4) performs the concatenation.

Short-ordinal-and-short-integer-divides-and-multiplies use the master slave the same way that the other divide-and-multiply operations use the FIFO. This requires the master to be gated to the B-bus. Assertion of @M@B gates the master to the B-bus. Certain perform-operation microinstructions require the master to be initialized to all zeros or all ones, depending on the sign of operand B (SB). Assertion of @ALL1@M loads ones into the lower-16 bits of the master. Assertion of @ZMCB$\phi$ and the unassertion of @ALL1@M loads zeros into all 18 bits of the master.

3.3.4 ALU Shift Register

The ALU shift register, 806, (SR15 . . . SR$\phi$) is a 16-bit parallel-read, parallel-write, shift-left, skip-shift (shift by 2)-left, skip shift-right, shift register. It is used for developing quotient bits for divide, test bits for square root, loading the multiply-control bits (MCB2 . . . MCB$\phi$) for multiply, and developing the final product bits for multiply.

Assertion of @B@SR loads the B-bus into the shift register. Assertion of MSSR@C gates the shift register to the C-bus.

For multiply, assertion of MSSHR2 loads SRn into SRn-2 (for n=2 . . . 15), the two LSBs of the partial product (ALU1#1st . . . ALU$\phi$#1st) into SR15 . . . SR14, SR1 . . . SR$\phi$ into MCB2 . . . MCB1, and MCB2 into MCB$\phi$. The multiply-control bits control the ALU according to the following table.

| MCB2 . . . MCB$\phi$ | FUNCTION |
|---|---|
| 000 | B |
| 001 | B + A |
| 010 | B + A |
| 011 | B + 2A |
| 100 | B − 2A |
| 101 | B − A |
| 110 | B − A |
| 111 | B |

Assertion of @ZMCB$\phi$ clears the MCB$\phi$ flag.

For divide, assertion of MSSHL1 loads SRn into SRn+1 (for n=$\phi$. . . 14), and the quotient bit [CF xor (SA) (MI)] into SR$\phi$.

For square root, assertion of MSSHL2 loads SRn into SRn+2 (for n=$\phi$. . . 13). The low-order-two bits are lost.

3.4 Operational Flags

A large number of flags are loaded as a result of data computation or data movement. The following sections define these flags and indicate the functional blocks associated with them.

3.4.1 Arithmetic and Logical Flags (ZERO, ONES, LSB, SIGN)

Four flags keep track of result information during arithmetic and logical-type microinstructions. The flags are ZERO denoting an all-zero result; ONES denoting an all-ones result; SIGN denoting the most significant bit of the result; and LSB denoting the least significant bit of the result. Assertion of @LOADF causes all four flags to be loaded. Assertion of @CLDF causes the ONES and ZERO flags to be loaded only if the present value of the flag is asserted, and the SIGN flag is loaded unconditionally. (The @CLDF signal is used to handle multidouble-byte data types). Note that for character-data types the SIGN flag is loaded with a zero, but for all other data types the SIGN flag is loaded with the MSB of the result. This is a result of having a 16-bit-wide ALU, and not requiring the MSB information during character operations.

See TABLE I, below for a summary of the microinstructions which affect these flags.

3.4.2 Arithmetic-Only Flags (CARRY, COMP)

Two flags keep track of arithmetic-result conditions, the CARRY flag and the COMP flag. The CARRY flag designates the carry out of the most significant bit of the ALU for the data type in question. Assertion of @C16@CY causes the carry out of the fifteenth stage (for those of you who count from $\phi$ to 17, sixteenth stage for those of you who count from 1 to 18) of the ALU to be loaded into the CARRY flag. This is used for 16-bit-nonfaulting-data types and for the first-double byte of 32-bit-data types.

See Table I, below for a summary of which microinstructions affect the CARRY flag.

The COMP flag designates that a computation fault is about to occur for microinstructions which are faultable and use the ALU to compute their results. The following signals are used to load the COMP flag.

@C8@CP: Assertion of this signal loads the carry out of the seventh stage of the ALU into the COMP flag, which indicates an overflow condition of character-add operations.

@#C8@CP: Assertion of this signal loads the complement of the carry out of the seventh stage of the ALU into the COMP flag, which indicates an overflow condition of character-subtract operations.

@C16@CP: Assertion of this signal loads the carry out of the fifteenth stage of the ALU into the COMP flag, which indicates an overflow condition of short-ordinal and ordinal-add operations.

@#C16@CP: Assertion of this signal loads the complement of the carry out of the fifteenth stage of the ALU into the COMP flag, which indicates an overflow condition of short-ordinal and ordinal-subtract operations.

@C1516@C: Assertion of this signal loads the exclusive-or of the carry out of the fourteenth stage and the carry out of the fifteenth stage of the ALU into the COMP flag, indicating an overflow condition for short-integer-add-and-subtract operations.

@Z@CMP: Assertion of this signal loads the logical-or of the C-bus into the COMP flag, indicating a mismatch during a test-segment-type microinstruction.

@S13@CMP: Assertion of this signal loads the sum of the thirteenth stage of the ALU into the COMP flag indicating an overflow condition as a result of an add-to-IP-stack microinstruction.

@CLRCMP: Assertion of this signal resets the COMP flag, and occurs as a result of a reset-processor microinstruction or by the Execution Unit's internal fault state.

TABLE I
ALU FLAG-LOAD CONDITIONS

X = loaded with correct information
$\phi$ = loaded with zero
u = flag changed but is indeterminate

| Microinstruction | ZERO | $\phi$ ENSS | LSBB | SIGN | CARRY |
|---|---|---|---|---|---|
| Logical C, S$\phi$, $\phi$ | x | x | x | x | |
| ROM OP DEQ to DEQ | x | x | x | x | |
| DEQ op DEQ to REG | x | x | x | x | |
| REG op DEQ to DEQ | x | x | x | x | |
| Extract | x | x | x | x | |
| Add C | x | x | x | $\phi$ | |
| Subtract C | x | x | x | $\phi$ | |

TABLE I-continued
ALU FLAG-LOAD CONDITIONS

X = loaded with correct information
$\phi$ = loaded with zero
u = flag changed but is indeterminate

| | | | | | |
|---|---|---|---|---|---|
| Increment C | x | x | x | $\phi$ | |
| Decrement C | x | x | x | $\phi$ | |
| Add S$\phi$, S1 | x | x | x | x | |
| Subtract S0, S1 | x | x | x | x | |
| Increment S$\phi$, S1 | x | x | x | x | |
| Decrement S$\phi$, S1 | x | x | x | x | |
| Add $\phi$, 1 | x | x | x | x | u |
| Subtract $\phi$, 1 | x | x | x | x | u |
| Increment $\phi$, 1 | x | x | x | x | u |
| Decrement $\phi$, 1 | x | x | x | x | u |
| Add NF, NFC | x | x | x | x | x |
| Subtract NF, NFC | x | x | x | x | x |
| Increment NF, NFC | x | x | x | x | x |
| Decrement NF, NFC | x | x | x | x | x |
| Negate S1 | x | x | x | x | |
| Absolute Value S1 | x | x | x | x | |
| Negate 1 | x | x | x | x | u |
| Absolute Value 1 | x | x | x | x | u |
| Add to Displacement Stack NFC | u | u | u | u | x |
| Add to Displacement Stack | x | x | x | x | |
| Add to IP Stack | x | x | x | x | u |
| Perform Op except DIV64, REM64 | u | u | u | u | u |
| DIV64, REM64 | x | u | u | u | u |
| Negate the Rounding Flags | | | | | x |

3.4.3 Floating-Point Flags

The floating-point flags consist of the guard (G), round (R), and sticky (S) flags which keep track of the inexactness of a floating-point number during a floating-point computation. The signals that affect these flags are itemized below.

| | |
|---|---|
| @A@GRS, @LDS - | S: = G + R + S + A13 + A12 + ... + A$\phi$<br>R: = A14<br>G: = A15 |
| @B@GRS, @LDS - | S: = G + R + S + B13 + B12 + ... B$\phi$<br>R: = B14<br>B: = B15 |
| @C@GRS, @LDS - | S: = G + R + S + C13 + C12 + ... C$\phi$<br>R: = C14<br>G: = C15 |
| @C@GRS1 - | S: = R + S<br>R: = G<br>G: = C15 |
| @SHGRS - | G: = R<br>R: = S<br>S: = S |
| @ZGRS - | S: = R: = G: = $\phi$ |

3.4.4 Context Switch Time-Loaded Flags

Five flags are loaded from the context status word (stored in RAM, 810, Section 3.9) via assertion of @LDCTX. These flags are the rounding control flags, RND1, RND$\phi$, the precision-control flags, PREC1, PREC$\phi$, and the inexact mode flag, #XCT. These flags are tested by the flag mux (see Section 3.5).

3.4.5 Process Dispatch Time-Loaded Flags

The trace-mode flags (TRC1, TRC$\phi$) are loaded from the process-status (stored in RAM, 810, section 3.9) word via assertion of @LDPCS. These flags are decoded and tested by the flag mux (see Section 3.5).

3.4.6 Lookahead Flag

The lookahead flag (LAH) indicates when the instruction decoder on the Instruction Unit is in lookahead mode. It is set via assertion of @SETLK, and is reset via assertion of @CLRLK.

3.5 Flag Multiplexer

The flag multiplexer converts one of sixteen possible combinations of flags to one of either: a double byte with the LSB reflecting the flag and the upper-15 bits zero, in the case of the convert-flag-to-boolean microinstruction; a true/false indication in the case of the return flag to Instruction-Unit-condition microinstruction, or a fault in the case of a fault-on-flag microinstruction. The flag combinations along with the polarity of the I field to select the positive true value of the flag are defined below.

For the convert-flag-to-boolean microinstruction, assertion of @CVT1 causes the output of the flag mux to be gated to B$\phi$. Note that since the B-bus is precharged, the upper-15 bits remain high, thus the boolean is inverted at the input of the ALU.

| I FFFF | CONVERT-FLAG EQUATION |
|---|---|
| 0 0001 | ROUND = (notRND1) (notRND$\phi$) (G) (LSB + R + S) + (RND1) (notRND$\phi$) (SB) (G + R + S) + (notRND1) (RND$\phi$) (notSB) (G + R + S) |
| 0 0001 | OPAZ |
| 1 0010 | ZERO |
| 1 0011 | CARRY |
| 1 0100 | GTO = (CARRY) (notZERO) |
| 0 0101 | SA |
| 0 0110 | NEGF = (SA) (notOPAZ) |
| 0 0111 | POSF = (notSA) (notOPAZ) |
| 1 1000 | GTEQRF = (notSA) (notSB) (CARRY) + (notSB) (SA) + (SA) (SB) (notCARRY) + (OPAZ) (OPBZ) + ZERO |
| 1 1001 | EQRF = (ZERO) (SA eq SB) + (OPAZ) (OPBZ) |
| 1 1010 | GTRF = (notZERO) [(notSA) (notSB) (CARRY) + (notSB) (SA) + (SA) (SB) (notCARRY)] {notOPAZ + notOPBZ} |
| 1 1011 | GTIF = (notZERO) [(notSIGN) (SA) + (notSB) (SA + notSIGN)] |
| 1 1100 | GTEQIF = ZERO + (notSIGN) (SA) + (notSB) (SA + notSIGN) |
| 0 1101 | G + R + S |
| 1 1110 | G |
| 1 1111 | ASFUL |

For the return-flag-to-Instruction-Unit-branch-condition microinstruction, the flag returned is defined below.

| I FFFF | RETURN-FLAG EQUATION |
|---|---|
| 0 0000 | SIGN |
| 1 0001 | OPAZ |
| 0 0010 | ZERO |
| 0 0011 | CARRY |
| 1 0100 | UNBORSN = UNNB + SIGN |
| 1 0101 | SA |
| 0 0110 | ZERORES = (ZERO) (notG) (notR) (notS) |
| 0 0111 | OPXZ = OPAZ = OPBZ |
| 0 1000 | SAEQSB = SA eq SB |
| 1 1001 | OPBZ |
| 0 1010 | LSB |
| 0 1011 | S2453 = PREC1 xor PREC0 |
| 0 1100 | S24 = (PREC1) (notPREC0) |
| 0 1101 | TRCFLT = (notTRC1) (TRC$\phi$) |
| 0 1110 | TRCFLW = (TRC1) (notTRC$\phi$) |
| 1 1111 | LAH |

For the fault-on-flag microinstruction, the signal @FLTFLG enables a fault if the flag selected is asserted. The flags are defined below.

| I FFFF | FAULT-ON-FLAG EQUATION |
|---|---|
| 0 0000 | SIGN |
| 1 0001 | OPAZ |
| 0 0010 | ZERO |
| 0 0011 | CARRY |
| 0 0100 | GTO = (CARRY) (notZERO) |
| 1 0101 | SA |
| 1 0110 | INVAB = INVA + INVB |
| 1 0111 | INVABU = INVA + INVB + UNNA + UNNB |
| 1 1000 | INVABUZ = INVA + INVB + UNNA + OPAZ |
| 1 1001 | INVABUA = INVA + UNNA + (SA) (notOPAZ) |
| 0 1010 | INTOVRF = [(SB) (notONES) + (notSB) (notZERO)] (notOPAZ) (notOPBZ) |
| 0 1011 | DIVOVFL = (SA) (SB) (SIGN) |
| 0 1100 | (SIGN xor SB) (notOPAZ) (notOPBZ) |
| 1 1101 | INEXACT = (#XCT) (G + R + S) |
| 1 1110 | ZERO + SIGN |
| 0 1111 | TRUE |

3.6 Extractor

The extractor (434) extracts 16-contiguous bits from a 32-bit input field and gates the result to the C-bus via assertion of @X. The 32-bit input field can be thought of as two 16-bit fields EA15 . . . EA$\phi$ and EB15 . . . EB$\phi$, each of which can take on one of four values as determined by the AA and BB fields of the extract microinstruction. There also exists a temporary register (EXBREG), within logic block 808, which is loaded from either the A-bus or the B-bus as defined by the T-field in the extract microinstruction. The signals which load the EA-bus and the EB-bus and the extractor register are defined below.

| AA | EA15 . . . EA$\phi$ | Signal |
|---|---|---|
| 00 | Zero | @Z@EA |
| 01 | A15 . . . A$\phi$ | @A@EA |
| 10 | B15 . . . B$\phi$ | @B@EA |
| 11 | EXBREG | @EXB@EA |

| BB | EB15 . . . EB$\phi$ | Signal |
|---|---|---|
| 00 | Zero | @Z@EB |
| 01 | A15 . . . A$\phi$ | @A@EB |
| 10 | B15 . . . B$\phi$ | @B@EB |
| 11 | EXBREG | @EX@EB |

| T | EXBREG | Signal |
|---|---|---|
| 0 | A15 . . . A$\phi$ | @A@EXB |
| 1 | B15 . . . B$\phi$ | @B@EXB |

3.6.1 Shift-Count Register

The least significant bit position of the value to be extracted is specified by the current value contained in a 40-bit-shift-count register within logic block 434. Assertion of @XLFT indicates shift left. Unassertion of @XLFT indicates shift right.

The shift-count register is loaded from C3 . . . C$\phi$ via assertion of @L@XR, and is loaded from C11 . . . C8 via assertion of @U@XR.

3.6.2 Conditional-Shift Decrementer

The conditional-shift decrementer is a three-bit decrementer/register that is used with the conditional-shift-by-16 microinstruction to determine how to load the rounding flags and shift the source DEQ by 16-bit positions. The register is loaded from C6 . . . C4 via assertion of @L@XR, it is loaded from zero, C13 . . . C12 via assertion of @U@XR and it is decremented via assertion of @XDEC.

3.7 Significant-Bit Finder

The significant-Bit Finder

The significant-bit finder, 830, locates the most significant bit of 16-bit quantity and returns a value equal to the binary-bit position of the most significant one. If a one is not found, zero is returned as a result except for the conditions below. The significant-bit circuitry is enabled via assertion of @SB.

Support of multiprecision-significant bit is supported via the significant-bit flag (SBF) and the OPAZ flag. If a one is found during a significant-bit microinstruction, the SBF flag is set. Subsequent execution of the significant-bit microinstruction will then return the value 16 if SBF is set. Thus, execution of n significant-bit microinstructions followed by the summation of each result will find the significant bit of an n double-byte operand. The SBF flag is reset via assertion of @FFL during a reset-processor, end-of-macro, or an end-of-branch-macro microinstruction, thus only one multiprecision-significant-bit operation can be performed per macroinstruction.

The value 16 will also be returned if the OPAZ flag is set. This supports the short-ordinal and ordinal-significant-bit macro operators.

3.8 Constant ROM

The constant ROM (428) is a 16-bit by 33-location ROM. Assertion of @RDROM gates the contents of the ROM addressed by MI11, MI8 . . . MI4 onto the B-bus. The contents of the ROM are defined below.

| u I 1 1 | uuuuu IIIII 87654 | Constant (HEX) |
|---|---|---|
| 0 | xxxxx | 0000 |
| 1 | 00000 | 0000 |
| 1 | 00001 | FFFE |
| 1 | 00010 | 1F1F |
| 1 | 00011 | 3FFF |
| 1 | 00100 | FF$\phi\phi$ |
| 1 | 00101 | 7FFF |
| 1 | 00110 | C07F |
| 1 | 00111 | C3FF |
| 1 | 01000 | FFC$\phi$ |
| 1 | 01001 | DFFF |
| 1 | 01010 | BFE1 |
| 1 | 01011 | FF80 |
| 1 | 01100 | FFBF |
| 1 | 01101 | FFF2 |
| 1 | 01110 | 3FFE |
| 1 | 01111 | FFF$\phi$ |
| 1 | 10000 | FFBD |
| 1 | 10001 | 07FF |
| 1 | 10010 | FFD7 |
| 1 | 10011 | FFDF |
| 1 | 10100 | FFFB |
| 1 | 10101 | FF7F |

3.9 Register RAM

The register RAM (810) is a 16-bit by 4-deep RAM. Assertion of @RDRAM gates the RAM contents onto the B-bus. Assertion of @WRRAM writes the C-bus into the RAM. The RAM addresses are defined in the following table.

| uu II 54 | Register |
|---|---|
| 00 | Context Status |
| 01 | Processor Status |
| 10 | Process Status |
| 11 | Instruction Segment Selector |

3.10 C-Bus Mask Circuit

The C-bus mask circuit (not shown in FIG. 2) is used to force zeros to certain segments of the C-bus to effect a mask on those bits. Assertion of @FZ@CL clears bits C7..C$\phi$. Assertion of @FZ@CM clears bits C7..C5. Assertion of @FZ@CH clears bits C15..C8.

3.11 Decoded VVV to C-Bus Circuit

The decoded VVV to C-bus circuit (not shown in FIG. 2) decodes the VVV bits in the scale-displacement microinstruction according to the following table and gates the decoded value onto C3..C$\phi$ to be loaded into the extractor-shift-count register. Assertion of @V@C gates the value onto C3..C$\phi$.

| VVV | CCCC 3210 |
|---|---|
| 000 | 0000 |
| 001 | 0001 |
| 010 | 0010 |
| 011 | xxxx |
| 100 | 0011 |
| 101 | 0100 |
| 110 | xxxx |
| 111 | xxxx |

3.12 Math Algorithm FIFO

The math algorithm FIFO (408) is a 16-bit wide by 4-deep FIFO. Four validity bits are used to store the state of valid information on the FIFO, one bit associated with each register.

The topmost register of the FIFO is gated onto the B-bus and the FIFO is popped up by one level via assertion of @FPP. Data is dropped onto the FIFO from the C-bus via assertion of @FDR. After a drop operation all registers which are marked invalid contain the same information as the bottommost register which is marked valid. Dropping onto a full FIFO has no effect on any data in any register. All validity bits are marked invalid via assertion of @FFL. A double-byte of all ones or all zeros (depending on assertion of SB) is dropped into the FIFO via assertion of @FZ134. Three double bytes of all zeros is dropped onto the FIFO via assertion of @FZ134, and @FZ34. Four double bytes of all zeros is dropped onto the FIFO via assertion of @FZ134, @FZ34, and @FZ4.

3.13 System Timing Functions

Two timing functions are implemented in circuit 414, one to keep track of time from processor initialization, and one to keep track of the current process run time. Both timers are ticked via assertion of PCLK. (See the above-identified copending patent application of Daniel K. Jackson.)

3.13.1 System Timer Incrementer

The system timer is a 16-bit, up-counter register. Assertion of @RDST causes the inverted value of the register to be gated onto B15..Bφ. Assertion of PCLK causes the incremented value to be loaded into the register and assertion of PCLK for more than one consecutive cycle causes the register to be cleared.

3.13.2 Process Timeout Decrementer

The process timeout decrementer (412) is a 16-bit, loadable, startable, stoppable, faultable down-counter register. Assertion of @RDTIM causes the register to be gated to the B-bus. Assertion of @WRTIM causes the register to be written from the C-bus. Assertion of @TIMGO enables (in the case of a start-process-timer microinstruction) of disables (in the case of a stop-process-timer or a reset-processor microinstruction) the timer to be decremented upon assertion of PCLK. A fault (812) occurs upon execution of an end-of-macro or end-of-branch-macro microinstruction, if the value in the timer register is zero and it is running. Note that the timer does stop itself when a fault occurs. Also since at power-up the timer can take on any value, the timer must be loaded prior to starting it or an extraneous fault could occur. Note the frequency at which PCLK runs must be slower than the longest microinstruction.

4.0 DISPLACEMENT STACKS

Four stacks (404) are maintained on the Execution Unit for buffering displacement information to various segments in the main-memory address space. For the access microinstructions one of these stacks is gated to the D-bus for physical-address calculation and length verification (see Sections 5.3 and 5.4). These stacks also receive and gate information from/to the C-bus and B-bus, respectively, so that the information in these stacks can be manipulated in the DMU.

4.1 Segment Selector Stack

The Segment Selector Stack (SSSTK) is a 16-bit wide by 4-deep stack. The upper-14 bits of the topmost entry of the SSSTK are gated to D15..D2, and zeros are gated to D1..Dφ via assertion of @SSRD. The topmost entry is gated to B15..Bφ and the SSSTK is popped up one level via assertion of @SSPPR. Assertion of both @SSRD and @SSPPR inhibits gating the SSSTK to B15..Bφ. The SSSTK is pushed down one level and loaded from C15..Cφ via assertion of @SSPSH. This stack is used as a displacement for the access-list-access microinstruction. The top entry of this stack also drives the cache bus (814) which is used to compare entries in the CAM portion of both caches, 433, 435. (See Sections 5.1.1 and 5.1.2.).

4.2 Displacement Stack

The Displacement Stack (DXSTK) is a 16-bit wide by 3-deep stack. The topmost entry is gated to the D-bus via assertion of @DXRD. The topmost entry is gated and the DXSTK is popped up one level via assertion of @DXPPR. Assertion of both @DXRD and @DXPPR inhibits gating the DXSTK to the B-bus. The DXSTK is pushed down one level and loaded from the C-bus via assertion of @DXPSH. This stack is used as a displacement for the access-memory microinstruction.

4.3 Instruction-Pointer Stack

The instruction-pointer stack (IPSTK) is a 12-bit wide by 3-deep stack, and is used to hold the top-12 bits of the instruction segment displacement. The Instruction Unit holds and updates the bottom-four bits. The topmost entry is gated to D12..D1, and zeros are gated to D15..D13, Dφ via assertion of @IPRD. The topmost entry is gated to B12..B1, zeros are gated to B15..B13, Bφ, and the IPSTK is popped up one level via assertion of @IPPPR. The top entry of the IPSTK is loaded from C12..C1 via assertion of @IPWR, and an "enter" operation is performed via assertion of @IPENT (i.e., the second entry is loaded to the bottom entry, the top entry is loaded to the second entry, and the top entry is saved). Assertion of @IPWR, and @IPENT cause a normal push operation. This stack is used as a displacement for the instruction-fetch microinstruction.

4.4 Stack-Pointer Stack

The stack-pointer stack (SPSTK) is a 15-bit wide by 2-deep stack, and is used to hold the displacement into the operand-stack segment. The topmost entry is gated to D15..D1, and a zero is gated to Dφ via assertion of @SPRD. The topmost entry is gated to B15..B1, a zero to Bφ, and the SPSTK is popped up one level via assertion of @SPPPR. The top entry of the SPSTK is loaded from C15..C1 via assertion of @SPWR, and an enter operation is performed via assertion of @SPENT. Assertion of @SPWR and @SPENT cause a normal push operation. This stack is used as a displacement for the stack-access microinstruction.

5.0 REFERENCE GENERATION UNIT (RGU)

This section describes the structures which buffer segment descriptor information and compute and check physical addresses.

5.1 Base-and-Length File

The base-and-length file (430) is a 41-bit wide by 20-entry RAM which holds the 22-bit physical-base address, 16-bit segment length, read-and-write rights, and altered information for various system objects as well as a four-entry, data segment cache, and a two-entry segment table cache.

All 41 bits of a given register are read in parallel every cycle and are available to the address generator, 433, length-verification hardware, 431, and the rights-checking logic, 816.

Writing information into a given register can be accomplished in one of two ways:

First, the four microinstructions, load rights, load-physical-address upper, load-physical-address lower, and load-length, move the designated information from ADEQ (400) into the particular portion of the register via the M-bus. The bits are ordered in the same positions as defined in the segment descriptor, in the case of physical-base address, segment length, and altered bit, and as defined in the access descriptor for access rights (as described in the above-identified copending patent application of Stephen A. Colley, et al). Assertion of @RGUWR causes one of these four quantities to be written. U15, MI4 determine which of the four quantities is actually transferred. (Note that the transfer is not completed until the cycle following the load microinstruction, so any microinstruction which tries to read one of these registers must be delayed one cycle directly following a move microinstruction to that register.)

Second, the two microinstructions move-base-and-length-to-temporary and move-temporary-to-base-and-length may be executed to accomplish a 41-bit transfer from one segment-descriptor register to another. Assertion of @B@BWR causes the transfer. Note that addressing a cache register during this type of move is not recommended since cache misses are not indicated.

The altered bit is updated automatically if an altered fault occurs.

The addresses of the various registers is defined in the following table.

| uuuu IIII 3210 | Register |
|---|---|
| 0000 | Entry Access List |
| 0001 | Public Access List |
| 0010 | Context Object |
| 0011 | Private Access List |
| 0100 | Segment Table Directory |
| 0101 | Processor Object |
| 0110 | Dispatching Port |
| 0111 | Process Object |
| 1000 | Instruction Segment |
| 1001 | Operand Stack |
| 1010 | Context Control Segment |
| 1011 | Process Control Segment |
| 1100 | Work Register A |
| 1101 | Work Register B |
| 1110 | Data Segment Cache Set (4) |
| 1111 | Segment Table Cache Set (2) |

5.1.1 Data Cache

The data cache (435) consists of the following elements:

1. Four segment-descriptor registers which contain base, length, access rights, and altered information for the four most-recently-used data segments. These registers are addressed by the coincidence of the BBREG=111$\phi$ and the two CAM-encoder outputs, SSCA1..SSCA$\phi$. The CAM encoder outputs nominally, in the case of a match, are determined by an encoding of the match lines in the CAM. However, during a register qualification the CAM encoder outputs are determined by the least-recently-used register.

2. A four-entry-by-16-bit CAM which matches against the top value in the segment selector stack. The CAM continuously compares its contents against the top value of the segment-selector stack and asserts the signal SSCACHE if no match occurs. If a match is found, the four match lines are encoded into the two signals SSCA1..SSCA$\phi$. During an access if a match is not found (i.e., SSCACHE is asserted) the top entry of the segment-selector stack is loaded into the least-recently-used CAM entry and marked valid via assertion of @SSSHFT.

3. A two-bit-by-four-entry-associative-shift array that is used to compute the least-recently-used register (LRU) during a cache miss. The shift array is updated during every access via assertion of @SSSHFT.

4. Four validity bits (one for each entry in the CAM) to indicate the integrity of the cache entry. These validity bits can be reset microprogramatically. Assertion of @SSFL clears all four validity bits. Assertion of @SELFL with the unassertion of @CHK2BT clears the validity bit of the register which matches the top entry of segment-selector stack. Assertion of @SELFL with the assertion of @CHK2BT clears all the validity bits of registers which matches the low-order two bits of the top entry of the segment-selector stack (i.e., all registers of a given access list).

5.1.2 Segment Table Cache

The segment-table cache (433) consists of the following elements:

1. Two segment-descriptor registers which contain base, length, access rights, and altered information for the two most-recently-used segment table segments. These registers are addressed by the coincidence of the BBREG=1111 and the CAM encoder output, STCA$\phi$. The CAM encoder output nominally, in the case of a match, is determined by an encoding of the match lines in the CAM. However, during a register qualification the CAM encoder output is determined by the least-recently-used (LRU) register.

2. A two-entry-by-12-bit CAM which matches against the top value in the segment-selector stack bits 15..4. The CAM continuously compares its contents against the top value of the segment-selector stack and asserts the signal STCACHE if no match occurs. If a match is found, the two match lines are encoded into the signal STCA$\phi$. During an access, if a match is not found (i.e., STACHE is asserted), the validity bit of the least-recently-used CAM entry is marked invalid via assertion of @STSHFT. The subsequent load-length microinstruction loads the top entry of the segment-selector stack into the least-recently-used CAM entry and marks that register valid via assertion of @STLD.

3. A flip-flop is used to keep track of the least-recently-used register (LRU) during a cache miss. The flip-flop is updated during an access if a match was found (i.e., STCACHE is asserted) via assertion of @STSHFT, or during the load-length microinstruction via assertion of @STLD.

4. Two validity bits (one for each entry in the CAM) to indicate the integrity of the cache entry. These validity bits can be reset microprogrammatically. Assertion of @STFL clears all two validity bits.

5.2 Base-and-Length Register

The base-and-length register (BBREG) is a four-bit register that along with the cache-match-encoded signals addresses one of the twenty base-and-lengths as defined in the table above. Assertion of MI@BB loads MI3..MI$\phi$ into the BBREG. Assertion of MID@BB loads MI3..MI$\phi$ delayed one cycle into the BBREG to match the data being written. Assertion of SS@BB loads "$\phi\phi$," CA1, CA$\phi$ into the BBREG.

5.3 Length-Verification Hardware

The length-verification hardware (431) produces an indication of a segment-bound fault. It receives as input, the length field from the base-and-length file (LEN15..LEN$\phi$), the displacement bus (D15..D$\phi$), the operand length in bytes (OPL2..OPL$\phi$) (note that byte accesses to the operand-stack segment are treated as having an operand length of two bytes), and the ASFUL flag which indicates the number of double bytes in the on-chip-operand stack.

A segment-bound fault (BND) is computed as defined in the following equations.

For stack-access read: $BND:=(D15..D\phi + ASFUL - OPL2..OPL\phi) < \phi$.

For stack-access write: $BND:=(LEN15..LEN\phi - D15..D\phi - ASFUL - OPL2..OPL\phi) < \phi$.

For all other memory accesses: $BND:=(LEN15..LEN\phi - D15..D\phi - OPL2..OPL\phi + 1) < \phi$.

5.4 Address Generator and Specification Register

The address generator (433) computes the 24-bit physical address and checks for physical memory overflow. The specification register (SPEC7..SPEC$\phi$) creates the eight-bit-access-specification information which is asserted on the upper-eight bits of the ACD bus with the lower-eight bits of the address. The specification register is computed as per the following equations:

SPEC7 = LOCAL
SPEC6 = MI7
SPEC5 = (notMI13) (MI12) + (MI13) (notMI12) (MI11) (MI3)
SPEC4 = OPL2
SPEC3 = OPL1
SPEC2 = (OPL2) (OPL1 + OPL$\phi$ + MI13 + MI4)
SPEC1 = notMI3 + MI2 + MI1
SPEC$\phi$ = notMI3 + MI2 + MI$\phi$.

The specification register is gated to M15..M8 via assertion of @LA@M.

The address generator consists of an 11-bit adder which receives as input, the 22-bit base portion of the base-and-length file (BA23..BA2), the 16-bit displacement (D15..D$\phi$) and computes as output, a full 24-bit physical address (AG23..AG$\phi$), and an indication of physical-memory overflow (MOV). The address generation takes place over two consecutive cycles. Since the physical-base address is word aligned, the low-order-two bits of the displacement become AG1..AG$\phi$. The adder generates in the first cycle, AG12..AG2 and since only the first eight bits of the address are sent out to the ACD-bus, AG12..AG8 are saved until the next cycle, AG7..AG2 are driven to the ACD buffer via the LADR7..LADR2 lines, and AG1..AG$\phi$ are gated to M1..M$\phi$ via assertion of @LA@M. (The LADR7..LADR2 lines are necessary since there is not time to run the adder and gate the information to the M-bus.) In the second cycle, the adder generates AG23..AG13, and gates AG23..AG8 to M15..M$\phi$ via assertion of @HA@M. The carryout of the adder during this cycle is sampled and indicates a memory-overflow fault if asserted.

5.5 Rights-Checking Logic

The rights-checking logic (816) checks for four faults based on the three extra bits stored in a base-and-length file: altered fault, test-write-rights fault, read-rights fault, and write-rights fault. Four signals are asserted indicating the condition of these faults and are then prioritized by the fault priority encoder described below.

An altered fault is indicated if the altered bit equals zero during a write access or a RMW-read access. A test-write-rights flip-flop is set. The test-write-rights flip-flop is set via assertion of @TSTWRR during a test-write-rights microinstruction if the write-rights bit equals one. The flip-flop is reset via assertion of RESNOW which occurs during a reset processor or a reset 8802 fault-state microinstruction. The read-rights fault (RRFLT) and write-rights fault (WRFLT) are a function of the W and M fields of the access microinstruction and the read-rights bit (RR) and the write-rights bit (WR) as defined in the following table. The don't-care conditions during a RMW-write occur because the fault for those cases are already checked during the RMW read.

| WR MWRR | WR RR FF LL TT | | |
|---------|----------------|---|---|
| 0011 | 00 | Nominal Read | |
| 0010 | 01 | Nominal Read | |
| 0001 | 00 | Nominal Read | |
| 0000 | 01 | Nominal Read | |
| 0111 | 00 | Nominal Write | |
| 0110 | 00 | Nominal Write | |
| 0101 | 10 | Nominal Write | WRFLT = (notWR) [W + (M) (RR)] |
| 0100 | 10 | Nominal Write | > |
| 1011 | 00 | RMW Read | RRFLT = (notW) (notRR) |
| 1010 | 01 | RMW Read | |
| 1001 | 10 | RMW Read | |
| 1000 | 01 | RMW Read | |
| 1111 | 00 | RMW Write | |
| 1110 | xx | RMW Write | |
| 1101 | xx | RMW Write | |
| 1100 | xx | RMW Write | |

6.0 MATH SEQUENCER

The math sequencer (818) contains all the sequencing hardware to execute the sixteen variations of the perform-operation microinstruction.

6.1 Sequencer PLA

The math-sequencer PLA (820) controls the internal control flows and loops necessary to efficiently execute the perform-operation microinstruction. The PLA outputs include:

@IN5 ... @IN$\phi$: This is the address of the next math microinstruction to execute if a branch is to be taken.

@MSLD: Loads the address specified by @IN15 ... @IN$\phi$ into the math-sequencer-control ROM address register (RAR5 ... RAR$\phi$). If unasserted, the control-ROM address register is incremented.

@MSDEC: Decrements the loop counter (see Section 5.1.3).

@MSDN: Resets the math-sequencer-enable flip-flop, sends a done to the Instruction Unit to indicate that the perform-operation microinstruction is finished and causes the state transition from T1, T$\phi$=$\phi$1 to T1, T$\phi$=$\phi\phi$.

6.1.1 Control-Rom-Address Register (RAR5 ... RARφ)

The math-sequencer-control-ROM-address register (RAR5 ... RARφ) is a six-bit register used to address the currently-executing math microinstruction. It is also used as input to the math-sequencer PLA to control the sequence in which the math microinstructions are executed. It is loaded from @IN5 ... @INφ via assertion of @MSLD, or is incremented via unassertion of @MSLD.

6.1.2 Math-Sequencer-Enable Flip-Flop (MSEN)

The math-sequencer-enable flip-flop (MSEN) enables the math-sequencer-control-ROM outputs to be asserted only during a perform-operation microinstruction. The flip-flop is set via assertion of @LDCCCC, and is reset via assertion of @MSDN or @CLRMSEN.

6.1.3 Loop-Count Decrementer

The loop-count decrementer (822) is a six-bit register/decrementer that is used by the math-sequencer PLA to count the number of loops that a math-microinstruction sequence has gone through. The register is loaded during the first cycle of a perform-operation microinstruction and is decremented via assertion of @MSDEC.

6.2 MOD Register

The MOD register (824) is a six-bit register that is loaded prior to executing a perform-operation (64-bit MOD) microinstruction to indicate how many reduction cycles to perform. The register is loaded from C5 . . . Cφ via assertion of @LDMOD. The MOD-register contents are compared with the output of the loop-count decrementer and assert the signal EQ when they are equal. The number of reduction cycles executed is equal to 64 minus the value in the MOD register, where the MOD register can take on values between zero and 63. Note that this register is loaded when the RRRR field of the DEQ-OP-DEQ-to-register microinstruction is 1010.

6.3 Control ROM

The math-sequencer-control ROM (802) contains the 28-bit math microinstructions addressed by the control-ROM-address register. The outputs comprise the MSxxxxxx-bus and are described in Section 2.2.4.4

7.0 ACCESS SEQUENCER

The access sequencer (403) contains all the necessary hardware to access memory and the operand stack. The following is a list of the buffering registers and control flags within logic block, 403.

One Register: 16-bit register which is used to buffer the next double byte of address, specification, or data to be sent out to the ACD pins. This register is necessary since write data is stretchable. All outbound data and address information (except bits 2 ... 7 of the address) are sent through this register. Assertion of M@1 loads non on-chip stack information from M15 ... Mφ into this register. Assertion of S@1 loads the on-chip stack information from M15 ... Mφ into this register.

ACD Register: 16-bit register which holds the current double byte of address, specification, or data at the ACD pins. Assertion of @LA@ACD loads bits 15 ... 7, 1, φ from the One Register and bits 7 ... 2 from the address-generator adder. Assertion of @O@ACD loads the One Register into the ACD Register.

On-chip Operand Stack: 16-bit register which is the extension of the operand stack. Assertion of @S@M gates this register to M15 ... Mφ. Assertion of @M@S gates M15 ... Mφ into this register.

OPL Decrementer: 3-bit register/decrementer which is initialized to the operand length via assertion of @VVV@OPL, and counts down to zero as each double byte of data is read or written from/to memory via assertion of DECOPL. This register or the decremented value is gated via circuit 826 to the A-bus for IP and SP update during instruction-segment-read-and-stack-access microinstructions via assertion of @OPL@A.

ENACD Flip-Flop: This flip-flop is the tristate control for the IO drivers on the ACD pins during read accesses.

ASxxxxxx Bus: These signals are defined in Section 2.2.4.3.

8.0 FAULT HANDLING

Several faults are detected by the Execution Unit upon execution of certain microinstructions. When this occurs the Execution Unit sets the fault flip-flop (FLT), thus entering its internal-fault state (see Section 2.2.5) and sends a four-bit code on the BP/F bus (217) to the Instruction Unit indicating the generic-fault type (see TABLE II below) along with the assertion of the fault pin (221). Also for certain faults the fault-encoding register is loaded with a value indicating more specific information concerning the fault (see Section 8.1). Certain faults that occur during an access microinstruction must be prioritized since more than one fault can occur at the same time. The priority is shown in the following list. Note that where more than one fault occurs with the same priority, only one fault is possible.

Fault Priority List

1. Data cache, segment-table-cache faults
2. Memory-bound fault
3. Memory-overflow fault
4. Read-rights, write-rights faults
5. Test-write-rights fault
6. Altered fault The signals which qualify when a particular fault is possible are enumerated below.

@FLACC1: Checks read-rights, write-rights, segment-table-cache fault, data-cache fault, altered fault, and test-write-rights fault.

FLACC2: Checks memory-bound fault and memory-overflow fault.

@FLSCL: Checks scale-displacement fault.
@FLCMP: Checks computation fault.
@FLADIP: Checks add-to-IP-stack fault.
@FLADDX: Checks add-to-displacement-stack fault.
@FLTST: Checks test-segment-type fault.
@TIMUPOK: Checks timeout fault.
@FLIFCH: Enables instruction-fetch-special condition.

TABLE II

| BPF3 ... BPOφ ENCODINGS | |
|---|---|
| BPF3 ... BPFφ | Fault |
| 0000 | Not used |
| 0001 | Address development |
| 0010 | Process timeout |

TABLE II-continued

BPF3 ... BPOφ ENCODINGS

| BPF3 ... BPFφ | Fault |
|---|---|
| 0011 | Computational |
| 0100 | Fault on flag |
| 0101 | Data cache |
| 0110 | Segment table cache |
| 0111 | Segment altered |
| 1000 | Not used |
| 1001 | Not used |
| 1010 | Not used |
| 1011 | Not used |
| 1100 | Not used |
| 1101 | Not used |
| 1110 | Not used |
| 1111 | Not used |

Address-development faults include the following:
Scale displacement
Add-to-displacement stack
Add-to-IP stack
Test-segment type
Memory bound
Memory overflow
Read rights
Write rights
Test-write rights

8.1 Fault-Encoding Register

The fault-encoding register (within Fault Logic, 410) is a sixteen-bit register used to hold fault information. Assertion of @FLT@B gates the register to B15 ... Bφ. (Note that this register is gated negative true.) Assertion of @MI@F loads MI13 ... MI9, MI7, MI4 ... MIφ into the register in their proper bit position. Assertion of FR@FLT loads the fault ROM into the register bits 15 ... 14 and 6 ... 5. TABLE III defines the values stored in the fault-encoding register for the various types of faults that can load it. The X indicates an undefined value. The JJ, W, BBBB, P, and M fields correspond to the fields of the same name in an access microinstruction. The EE, EEEE, and I fields correspond to the fields in the fault-on-flag microinstruction. The F field corresponds to the second-most-significant bit of the FFFF field in the fault-on-flag microinstruction. The K, KKKKK, and SS fields correspond to the most-significant bit of the KKKKKKKK field, the least-significant-five bits of the KKKKKKKK field, and the SS field, respectively, in the test-segment-type microinstruction. The RR, RR field of the fault register (TABLE III) corresponds to the value loaded from the fault ROM (see TABLE IV). (Note that for an altered fault during an access-list-access microinstruction the BBBB field is Mφφφ. Therefore, the fault-handling microcode must read the SSSTK to determine which access list faulted.)

TABLE III

| Fault Register | Microinstruction | |
|---|---|---|
| RRφMPJJφ | WRRVBBBB | Access memory |
| RR1φφφ1φ | WRR11φφφ | Local access |
| RR1φ1JJφ | WRRVMφφφ | Access-list access |
| RR11φφφφ | φRRφ1φφφ | Instruction-segment read |
| RR111JJφ | WRRV1φφ1 | Operand-stack access |
| RR111EEφ | WRRV1φφ1 | Fault-on-flag |
| φ111φSSφ | KφφKKKKK | Test-segment type |
| φφXXXXXφ | XφlXXXXX | Scale displacement |
| φφXXXXXφ | X1φXXXXX | Add-to-displacement stack |
| φφXXXXXφ | X11XXXXX | Add-to-IP stack |

TABLE IV

| RR | RR | Fault |
|---|---|---|
| φ1 | φ1 | Segment bound |
| φ1 | 1φ | Memory overflow |
| φ1 | 11 | Read rights |
| 1φ | φφ | Write rights |
| 1φ | φ1 | Test-write rights |
| XX | XX | Altered |
| XX | XX | Bus error |
| XX | XX | Segment-table cache |
| XX | XX | Data cache |

8.2 Fault-disable Flip-Flop

The fault-disable flip-flop (within Fault Logic, 410) is used to disable faults so that the on-chip operand stack can be flushed to memory during process suspension. The flip-flop is set via assertion of @SETFDIS during a set-stack-flush-mode microinstruction. It is cleared via assertion of @CLFDIS during a clear-stack-flush-mode or a reset-processor microinstruction. The faults disabled are memory-bound, memory-overflow, and write-rights faults.

8.3 Address-Development Faults during Instruction Fetches

Address-development faults which occur during an instruction-segment-read microinstruction while in lookahead mode require special attention. These faults may not really be valid since the instruction which the Instruction Unit has requested the Execution Unit to fetch may be after a branch instruction. To handle this case the Execution Unit enters its fault state temporarily, aborting the present instruction-segment-read microinstruction and then sends the fault information and a done indication to the Instruction Unit and proceeds on to the next microinstruction. The Instruction Unit then must decide whether or not the fault should be serviced.

9.0 PROCESSOR INTERFACE

The processor interface is fully described in the above-identified copending patent application of Daniel K. Jackson. The pins involved include: ACD15 ... ACDφ, BIN, BOUT, HERRIN, HERROUT, MASTER, ISA, ISB, and PCLK.

10. EXECUTION UNIT/INSTRUCTION UNIT INTERFACE

This interface consists of the following pin definitions:

MI15 ... MIφ Pins (220): These 16 pins comprise a microinstruction bus which is used to transfer microinstructions and immediate data from the Instruction Unit to the Execution Unit. One 16-bit transfer is made every microcycle. For multicycle microinstructions, the first cycle transfers the operator code, and subsequent cycles transfer either a NO-OP or immediate data.

TRUE PIN (218): This pin transfers flag information from the Execution Unit to the Instruction Unit during a return-flag-to-Instruction Unit-branch-condition microinstruction.

DONE PIN (219): This pin is used to indicate to the Instruction Unit that the Execution Unit has completed a variable-length microinstruction. The Execution Unit expects the next microinstruction to be asserted on the MI15 ... MIφ pins the cycle immediately following the assertion of the done pin. The done pin is also asserted the cycle immediately following assertion of the fault pin (see below), except in the case of a process-timeout fault. This cancels any variable-length microinstruction that the Instruction Unit may have started prior to recognizing the fault.

BPF3 ... BPFφ PINS (228): These pins are used to transfer either bit-pointer information in the case of a transfer-DEQ-to-BIP microinstruction or a four-bit-fault encoding during a recognized fault. See TABLE II above for the definition of the fault encodings.

FAULT PIN (217): This pin is asserted during the same cycle that a fault encoding is asserted on the BPF3 ... BPFφ pins to alert the Instruction Unit that a fault has occurred and to latch the fault-encoding information. Note that assertion of a fault overrides the move-DEQ-to-BIP microinstruction if both occur at the same time.

11.0 TYPICAL EXECUTION UNIT OPERATION

Figure 2:
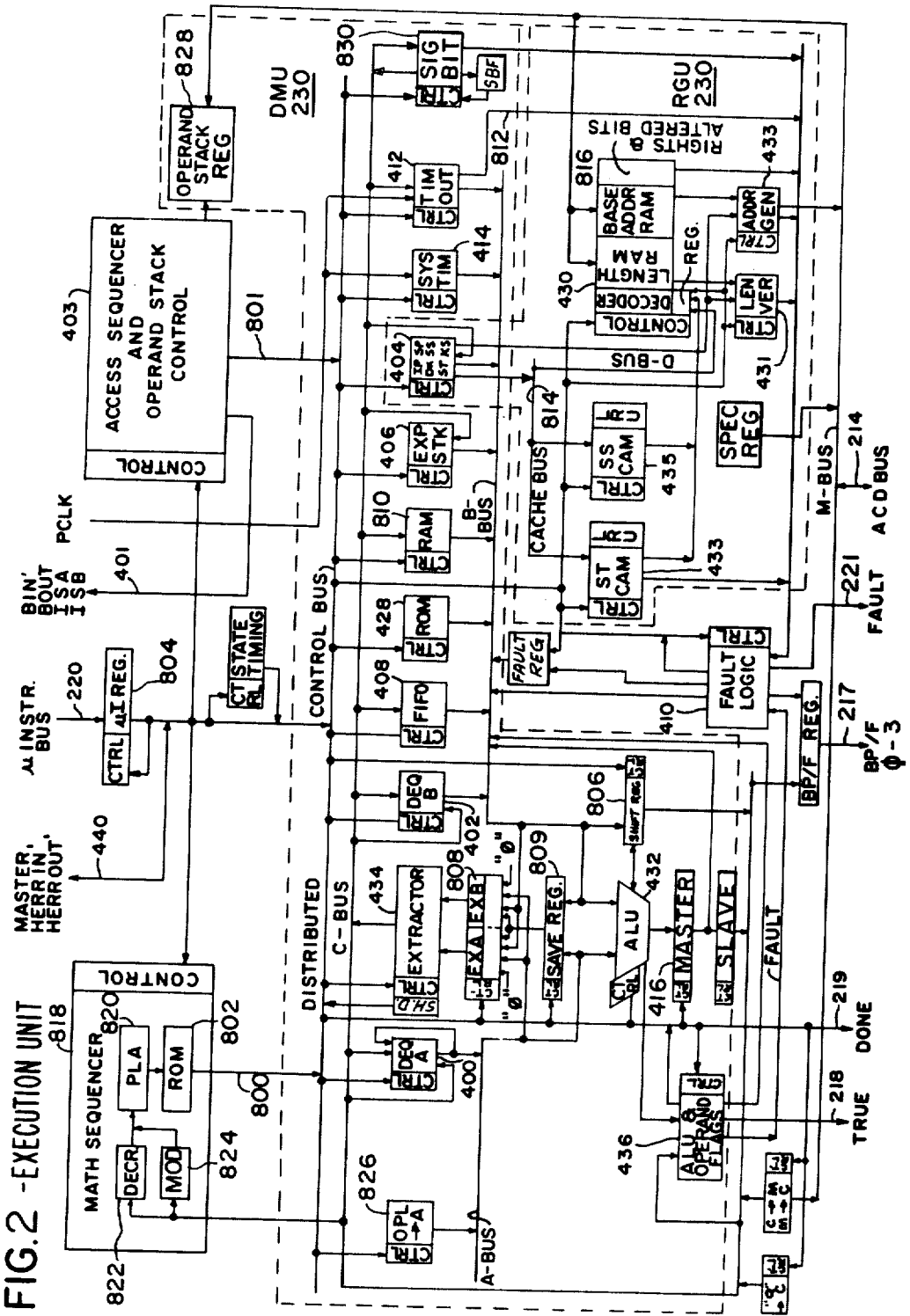
FIG. 2 is a more detailed block diagram of the execution unit shown in FIG. 1.

Refer to FIG. 2. The Execution Unit accepts, decodes, and executes a stream of microinstructions received from the microinstruction sequencer on the Instruction Unit. These instructions are received on the microinstruction bus (220) and are stored in the microinstruction register (804). The output of the microinstruction register is distributed to the math sequencer (818) and the access sequencer (403), each of which look for their own particular microinstructions to which they respond. The microinstruction set is fully described in Section 11 of the above-identified Colley, et al patent.

After going through an initialization sequence, the Instruction Unit sends a reset-processor microinstruction over the microinstruction bus where it is stored in the microinstruction register on the Execution Unit. In response to this microinstruction, the Execution Unit resets any internal-fault conditions, stops any multicycle microinstructions that may be in progress, and awaits new microinstructions from the Instruction Unit. A microinstruction flow is started by the Instruction Unit and is sent out over the microinstruction bus. These microinstructions perform the necessary operations to initialize the Execution Unit in accordance with the procedures set forth in the above-identified Colley, et al patent. When there is a process to be run on the Instruction Unit/Execution Unit processor, the internal registers are loaded with all the necessary addressing information about the process' current environment. When the registers on the Instruction Unit are loaded and the bit pointer and instruction pointer are initialized, the instruction decoder on the Instruction Unit is started. When started, the instruction decoder requests instruction data to be fetched from main memory by issuing an instruction-segment-read microinstruction. The access sequencer (403) responds to this microinstruction by utilizing the top of the IP stack (404), which specifies the displacement into the instruction segment to the next word of the instruction stream to be read. A 32-bit value is read from the instruction segment and loaded into the composer registers on the Instruction Unit, over the ACD bus from memory. After the operation successfully completes, the IP is incremented by four by reading out of the stack (404) over the B-bus to the ALU (432). The output of the ALU is returned to the IP stack over the C-bus.

Since this is a memory-access type of microinstruction, a variable number of cycles are needed for its completion. When the Execution Unit receives an access-memory type of microinstruction from the Instruction Unit, the Reference-Generation Unit (232) generates the principal address of the reference and stores it in the address generator (433). The address is gated to the memory over the ACD bus (214). The access sequencer also composes control information specifying the type of reference and the number of bytes to be transferred, whether the operation is a read or write operation, as more fully described in the above-identified Daniel K. Jackson patent. The Execution Unit then signals the memory over the ISA line. The Execution Unit monitors the ISB line received from memory. During a read operation (such as an instruction-segment read) when ISB is asserted high, this indicates that valid data has been placed on the ACD bus by the memory. After all of the bytes requested have been transferred, the access sequencer asserts the done line (219) to signal the Instruction Unit that the variable instruction has been completed. The Instruction Unit now proceeds to transfer the next microinstruction to the Execution Unit over the microinstruction bus (220).

In order to illustrate the operation of the math sequencer and the data-manipulation unit (DMU), the sequence of execution of the macroinstruction add-short-ordinal will now be described. This macroinstruction requires three data references. It performs a 16-bit addition on the short-ordinal-source operands, and places the result in a destination address. A short-ordinal-overflow fault can occur. The Instruction Unit begins decoding the instruction and sends the logical address (segment selector and displacement) of the first-source operand across the microinstruction bus where they are stored in the stack (404) on the Execution Unit. The Instruction Unit then sends a microinstruction which, when executed by the Execution Unit, loads the source value from main memory, or the operand stack (828) to the DEQA register (400). The RGU (232) translates the logical address into a physical address for referencing main memory. The second-source operand is loaded in a like manner from memory into the DEQB register (402). Next, the logical address of the result is passed to the DMU where it is stored. The OP-CODE field of the macroinstruction decoded by the Instruction Unit indicates that this is an add instruction. An add microinstruction is thus sent by the Instruction Unit to the Execution Unit. The math sequencer (818) responds by setting the decrementer (822) to three cycles, and proceeds to step through the PLA sequences (820) which reads out the microinstructions from ROM (802) necessary to perform the operation. These microinstructions cause the values in DEQA and DEQB to be passed through the adder in the ALU (432) with the sum being placed back into the DEQB register. The instruction is completed when the Instruction Unit sends a microinstruction to the Execution Unit instructing it to store the result from DEQB into the destination location in main memory.

The access sequencer responds to a memory-access microinstruction to generate a physical address from a logical address as follows. The segment selector in SSCAN (435) is compared against the values in the base-and-length-register cache (430). If there is no match, a fault is generated to fault logic (410) and the memory access is stopped. The fault logic signals the Instruction Unit that a fault has occurred by placing a fault encoding on the BP/F bus (217) and raising the fault line (221). The Instruction Unit responds to the fault by commencing a fault microprogram flow. This fault flow will load the correct base-and-length information into the registers and then restart the memory access.

If a match did occur, the base address and length of the segment to be accessed is read from the cache (430). Next the displacement is compared in the length-verification comparator (431) to the length of the segment to check that the access is within bounds. If the access is out of the segment or if the access rights (read or write) do not allow the operation, a fault is generated and the access is terminated. If no faults occur, the base address is added to the displacement in the address generator (433) to provide the physical address of the desired value.

A variable microinstruction requires that the Execution Unit not accept any new microinstructions until the variable microinstruction has completed. Completion of the microinstruction is signaled one cycle before it completes by raising the done line to the Instruction Unit. For example, consider the perform-operation microinstruction. This microinstruction initializes and starts the PLA-state machine (820) on the Execution Unit that sequences through appropriate microinstructions to perform the function of multiply, divide, remainder, MOD, and square root. A four-bit field in the microinstruction specifies the type of operation to be performed. With such a microinstruction, execution control is in effect transferred to the Execution Unit. The math sequencer has stored in the ROM (802) the microinstruction flows for the various arithmetic operations. The Instruction Unit records the fact that it has issued a variable-cycle microinstruction and therefore loops until it receives a signal on the done line. The Execution Unit starts the appropriate ROM flow, and one cycle before the operation is completed, it asserts the done line to the Instruction Unit. The Instruction Unit then places the next microinstruction on the microinstruction bus. By asserting the done line one cycle before the operation is complete, the Execution Unit has ensured that no cycles will be lost between microinstructions.

While the microinstruction sequencer on the Instruction Unit is sending microinstructions to the Execution Unit, the instruction decoder on the Instruction Unit is interpreting the fields of a macroinstruction. When the instruction decoder runs out of bits to process, it informs the Microinstruction Sequencer (MIS). The MIS, at an appropriate point in the microinstruction flow, interrupts the flow and sends the instruction-segment-read microinstruction, discussed above, to the Execution Unit. The Execution Unit maintains a program-byte counter and has the address of the instruction segment stored. The Execution Unit develops the appropriate physical address, references memory, and increments the program counter by four bytes. The 32-bits references in main memory are transferred over the ACD bus to the registers on the Instruction Unit. The Execution Unit raises the done line which signals the MIS to return to the microinstruction flow it interrupted, and the instruction decoder starts decoding and interpreting the new instruction bits.

Macroinstruction decoding and execution continues in this way until a macroinstruction is executed that suspends the process, or a fault occurs, or the process times out.

While the invention has been particularly shown and described with reference to a preferred embodiment thereof, it will be understood by those skilled in the art that various changes in form and detail may be made therein without departing from the spirit and scope of the invention.

What is claimed is:

1. For use with an Instruction Unit of the type which receives macroinstructions over a memory bus from a main memory, interprets said macroinstructions, and issues memory-access types of microinstructions and arithmetic types of microinstructions; and for use with said main memory by transmitting and receiving data and addresses over said memory bus, an Execution Unit comprising:

A. an access sequencer for sequencing a state machine through operations necessary to execute said memory-access types of microinstructions;

a reference-generation unit connected to and controlled by said access sequencer, said reference-generation unit containing an arithmetic unit capable of generating and checking addresses in a main-memory address space for developing physical-memory addresses from logical-memory addresses contained in a memory-access microinstruction, for use in accessing said main memory over said memory bus, and for transfer to said instruction unit;

a first state machine;

means in said access sequencer for decoding a memory access microinstruction issued by said instruction unit;

means in said access sequencer connected to said first state machine and to said means for decoding a memory access microinstruction for sequencing said first state machine through the cycles necessary for said reference generation unit to execute a function specified by said memory access microinstruction;

B. a math sequencer for decoding an arithmetic type of microinstruction including means for sequencing a state machine through operations necessary to execute said microinstruction;

a data-manipulation unit connected to and controlled by said math sequencer for performing arithmetic operations called for by said arithmetic-type of microinstruction issued by said instruction unit;

said data manipulation unit containing registers and an arithmetic unit capable of performing arithmetic operations;

a second state machine;

means in said math sequencer for decoding an arithmetic microinstruction issued by said instruction unit;

means connected to said second state machine and to said means for decoding an arithmetic microinstruction for sequencing said second state machine through the cycles necessary for said data-manipulation unit to execute a function specified by said arithmetic microinstruction;

means in said math sequencer for signaling the instruction unit when the execution is complete; and, C. means connected to said access sequencer and to said math sequencer for distributing said microinstructions issued by said instruction unit to said means in said access sequencer for decoding a memory access microinstruction and to said means in said math sequencer for decoding an arithmetic microinstruction, to thereby enable an arithmetic microinstruction executable by said math sequencer to be separately decoded by said decoding means in said math sequencer to thereby provide for the commencing of immediate execution by said data manipulation unit, and to enable a memory-access microinstruction executable by said access sequencer to be separately decoded by said decoding means in said access sequencer to thereby provide for the commencing of immediate execution by said reference-generation unit.

2. The combination in accordance with claim 1 wherein said execution unit further comprises:
   a done output for interconnecting said execution unit with said instruction unit;
   means in said access sequencer connected to said done output for energizing said done output from the condition that a memory access called for by a memory-access microinstruction is substantially complete; and
   means in said math sequencer connected to said done output for energizing said done output upon the condition that an arithmetic operation called for by an arithmetic microinstruction is substantially complete.

3. The combination in accordance with claim 2 wherein said means in said math sequencer for energizing said done output includes a counter which counts the number of cycles comprising a multicycle microinstruction, and energizes said done output upon completion of said number of cycles.

4. The combination in accordance with claim 2 wherein said means in said access sequencer for energizing said done output includes means responsive to control signals from said main memory which indicate that said memory access is complete.

5. The combination in accordance with claim 1 wherein said access sequencer further comprises:
   means for interfacing with a main memory, said interfacing means including means for fetching information for transfer from said main memory to said instruction unit; and
   means for signaling said instruction unit that the fetch is complete, to thereby inform the instruction unit that the execution unit is ready to accept a new microinstruction.

6. The combination in accordance with claim 5 wherein said means for signaling further comprises:
   an output line for interconnecting said execution unit with said instruction unit; and
   means for asserting said output line a fixed-time period prior to the end of the last clock cycle of a series of cycles taken during said information fetch.

7. The combination in accordance with claim 1 wherein said means in said math sequencer for decoding an arithmetic microinstruction further comprises:
   means for decoding an arithmetic microinstruction, execution of which requires a variable number of clock cycles to complete;
   means for sequencing said second state machine through said number of cycles necessary to execute a function specified by said arithmetic microinstruction; and
   means for signaling said instruction unit that said execution is complete, to thereby inform the instruction unit that the execution unit is ready to accept a new microinstruction.

8. The combination in accordance with claim 7 wherein said means for signaling further comprises:
   an output line for interconnecting said execution unit with said instruction unit; and
   means for asserting said output line a fixed-time period prior to the end of the last one of said variable clock cycles.

9. The combination in accordance with claim 1 further comprising:
   fault logic means including means for receiving fault information from said reference-generation unit and from said data-manipulation unit;
   a multibit fault output for use in interconnecting said fault logic with said instruction unit;
   means in said fault logic for placing a fault encoding on said fault output; and
   means for signaling said instruction unit that a fault condition has occurred.

10. The combination in accordance with claim 9 wherein said means connected to said access sequencer and to said math sequencer for distributing said microinstructions is connected to said fault logic and includes means for distributing said microinstruction to said fault logic.

* * * * *

UNITED STATES PATENT AND TRADEMARK OFFICE
CERTIFICATE OF CORRECTION

PATENT NO. : 4,367,524

DATED : January 4, 1983

INVENTOR(S) : David L. Budde, et al.

It is certified that error appears in the above-identified patent and that said Letters Patent are hereby corrected as shown below:

Column 1, line 14, the part which reads "In copending patent application serial number 971,661 of", should read --In U.S. patent 4,325,120 of--;

Column 1, line 16, the part which reads "filed Dec. 21, 1978," should read --filed Dec. 21, 1978, which was granted on April 13, 1982 and is assigned to Intel Corporation,--;

CLaim 2, column 37, line 16, the part which reads "done output from" should read --done output upon--.

Signed and Sealed this

Twenty-seventh Day of December 1983

[SEAL]

Attest:

GERALD J. MOSSINGHOFF

Attesting Officer  Commissioner of Patents and Trademarks